US009383563B2

(12) United States Patent
Hayashi

(10) Patent No.: US 9,383,563 B2
(45) Date of Patent: Jul. 5, 2016

(54) CONFOCAL IMAGE GENERATION APPARATUS

(71) Applicant: OLYMPUS CORPORATION, Shibuya-ku, Tokyo (JP)

(72) Inventor: Shinichi Hayashi, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 99 days.

(21) Appl. No.: 14/292,621

(22) Filed: May 30, 2014

(65) Prior Publication Data

US 2014/0361154 A1    Dec. 11, 2014

(30) Foreign Application Priority Data

Jun. 11, 2013  (JP) ................................ 2013-122678

(51) Int. Cl.
*G02B 21/00* (2006.01)

(52) U.S. Cl.
CPC .......... *G02B 21/0076* (2013.01); *G02B 21/008* (2013.01); *G02B 21/0072* (2013.01)

(58) Field of Classification Search
CPC .......... G02B 21/0072; G02B 21/0056; G02B 21/0048; G02B 21/0076; G02B 21/008; G02B 21/361; G02B 21/365; G01N 21/6458; G01N 23/2251; G01N 2015/1479; G06T 3/40
See application file for complete search history.

(56) References Cited

U.S. PATENT DOCUMENTS

| 5,915,048 A * | 6/1999 | Hill .......................... G06K 9/58 382/255 |
|---|---|---|
| 6,166,853 A * | 12/2000 | Sapia ..................... G02B 21/00 359/559 |
| 6,219,320 B1 * | 4/2001 | Amada .................. G11B 7/005 369/59.1 |
| 7,227,112 B2 * | 6/2007 | Storz ................... G01N 21/6458 250/201.3 |
| 7,649,682 B2 * | 1/2010 | Olschewski ......... G02B 21/365 359/363 |
| 7,710,469 B2 * | 5/2010 | Ueyama ............. H04N 5/23296 348/222.1 |
| 7,863,552 B2 * | 1/2011 | Cartlidge ........... G01N 21/6458 250/208.1 |

(Continued)

FOREIGN PATENT DOCUMENTS

JP    2013-20083 A    1/2013

OTHER PUBLICATIONS

T. Wilson, et al.: "Theory and Practice of Scanning Optical Microscopy", Academic Press, 1984, Chapter VI, Section 6, pp. 152 to 156 (in English).

(Continued)

*Primary Examiner* — John Lee
(74) *Attorney, Agent, or Firm* — Holtz, Holtz & Volek PC

(57) ABSTRACT

A confocal image generation apparatus includes a laser, an objective, an optical path branch element which branches an optical path of an excitation light and an optical path of fluorescence, a scanning optics which shifts alight collecting position of the excitation light on a focal plane of the objective in an orthogonal direction to an optical axis of the objective, an optical detector in which a plurality of light-receiving elements are two-dimensionally arrayed with a shorter pitch than a diameter of a fluorescence Airy disk formed on an imaging plane that is optically conjugated with the focal plane, and an image operation unit which generates a confocal image of the sample in which a super-resolution component is emphasized on the basis of a signal that is output from the plurality of light-receiving elements, the super-resolution component being a frequency component that exceeds a cut-off frequency of the objective.

17 Claims, 27 Drawing Sheets

(56) References Cited

U.S. PATENT DOCUMENTS

| | | | | |
|---|---|---|---|---|
| 8,933,418 B2* | 1/2015 | Hayashi | ............ | G01N 21/6458 250/458.1 |
| 2001/0015411 A1* | 8/2001 | Ohdaira | ............... | G02B 21/002 250/458.1 |
| 2002/0126732 A1* | 9/2002 | Shakouri | .................... | G01J 5/00 374/130 |
| 2002/0159058 A1* | 10/2002 | Weiner | .................... | B82Y 30/00 356/318 |
| 2005/0031182 A1* | 2/2005 | Inoue | ..................... | G06T 5/002 382/132 |
| 2007/0139541 A1* | 6/2007 | Fein | ................... | G01N 21/6458 348/294 |
| 2009/0201579 A1* | 8/2009 | Shibata | ............... | G02B 21/365 359/363 |
| 2009/0294694 A1* | 12/2009 | Lippert | ............. | G01N 21/6458 250/461.1 |
| 2010/0074486 A1* | 3/2010 | Broser | ..................... | G06T 5/50 382/128 |
| 2010/0327183 A1* | 12/2010 | Baltz | .................. | G01N 21/6408 250/458.1 |
| 2012/0081535 A1* | 4/2012 | Hayashi | ............. | G02B 21/0032 348/79 |
| 2013/0015366 A1 | 1/2013 | Hayashi | | |
| 2014/0361154 A1* | 12/2014 | Hayashi | ............. | G02B 21/0076 250/234 |

OTHER PUBLICATIONS

Claus B. Muller, et al.: "Image Scanning Microscopy", Physical Review Letters, May 14, 2010, vol. 104, pp. 198101-1 to 198101-4 (in English).

* cited by examiner

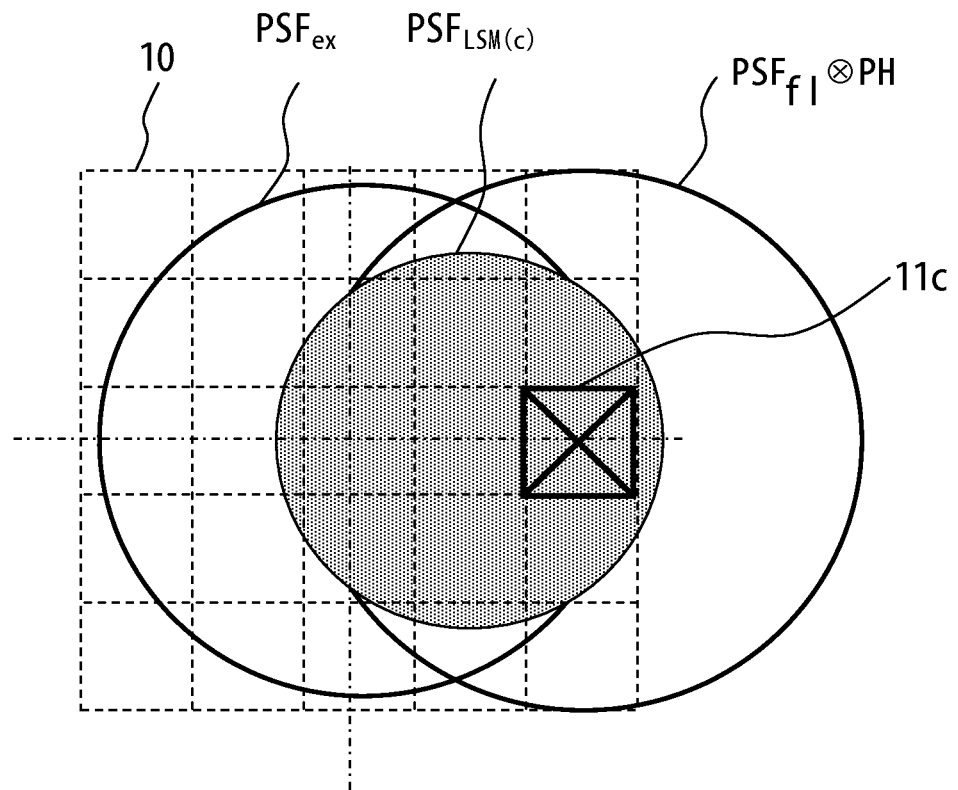
F I G. 2

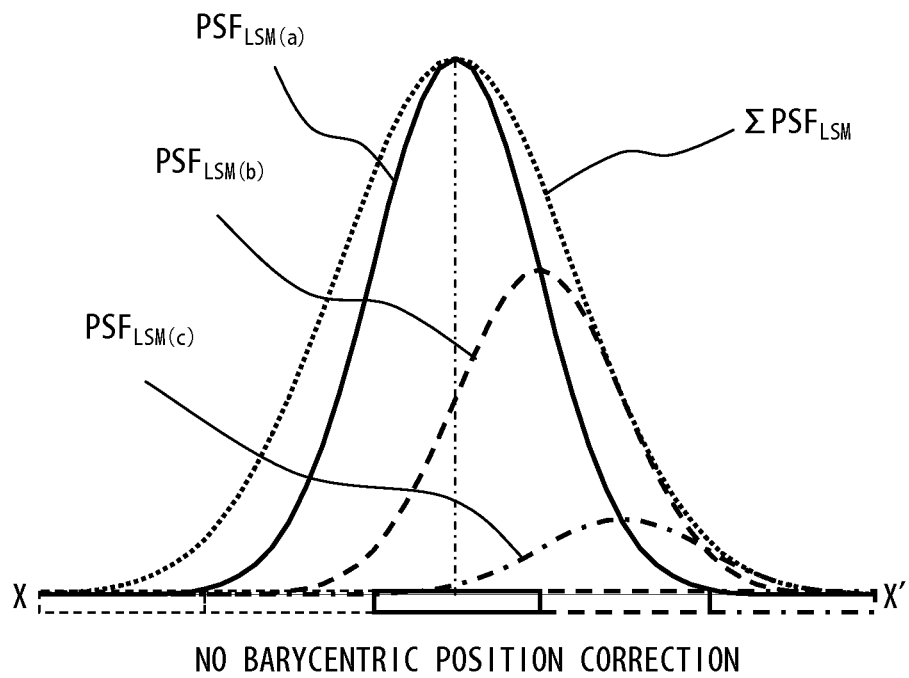
F I G. 3

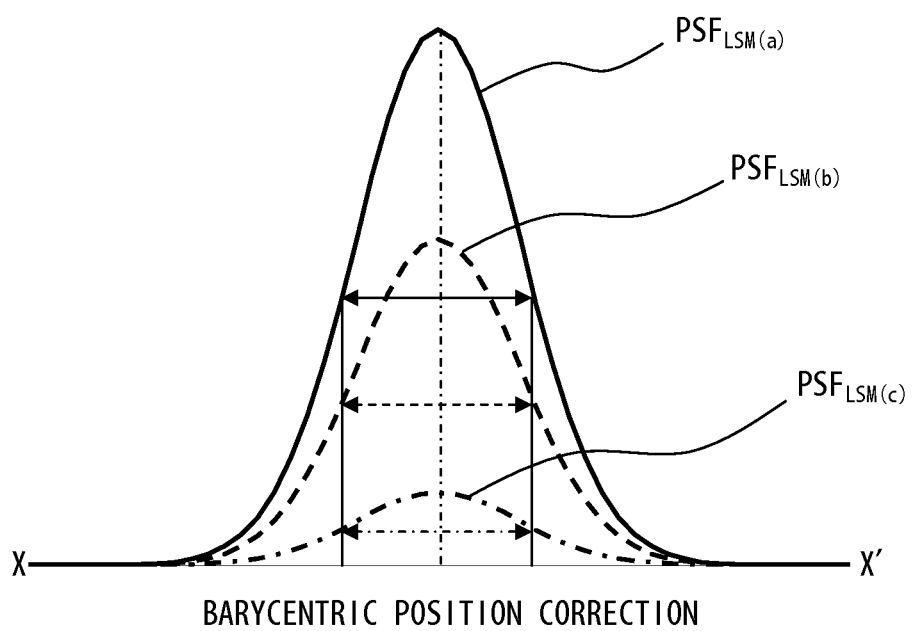
F I G. 4

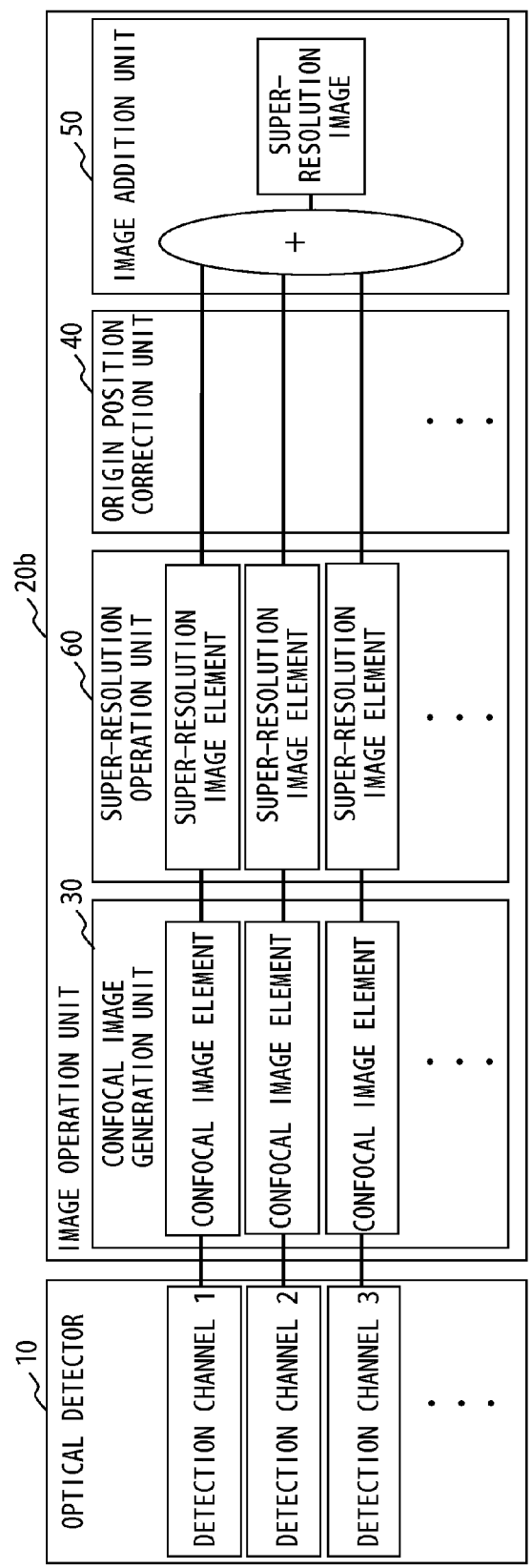
F I G. 6

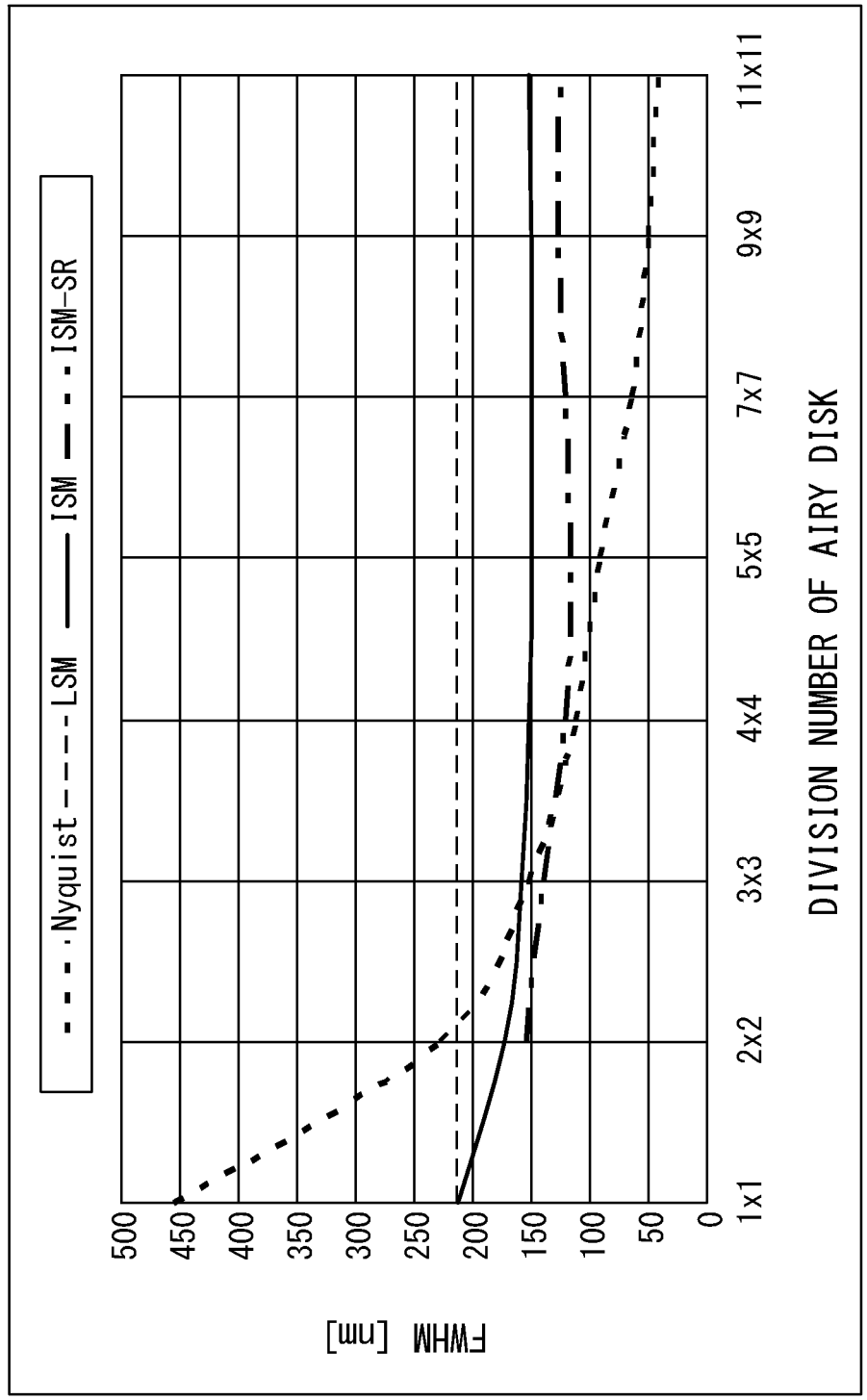
F I G. 13

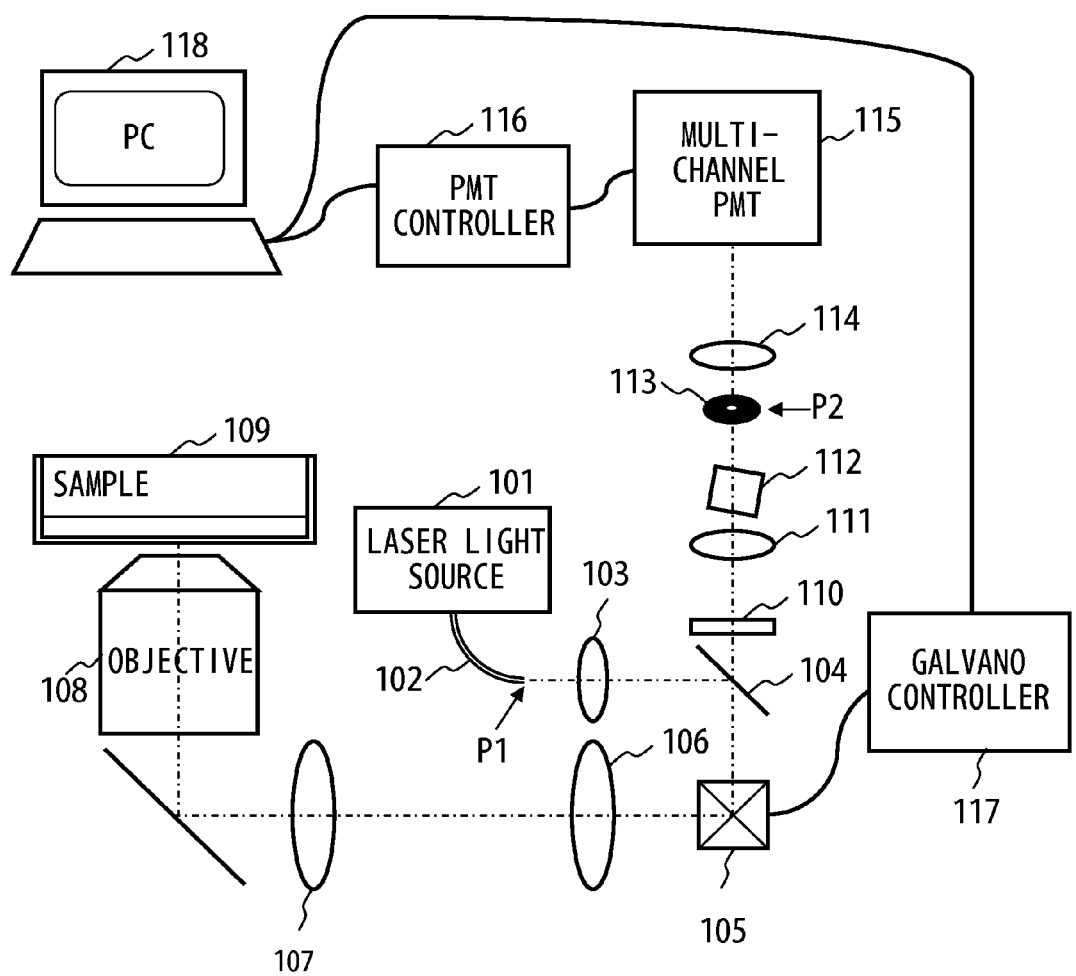
F I G. 1 4

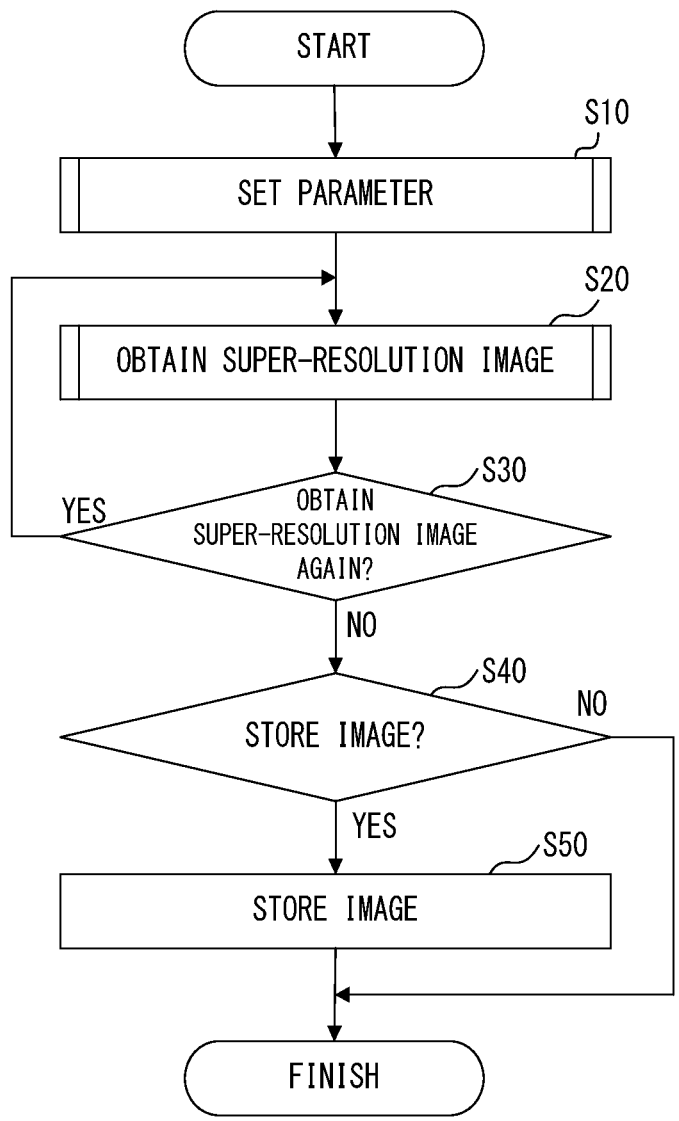
F I G. 15

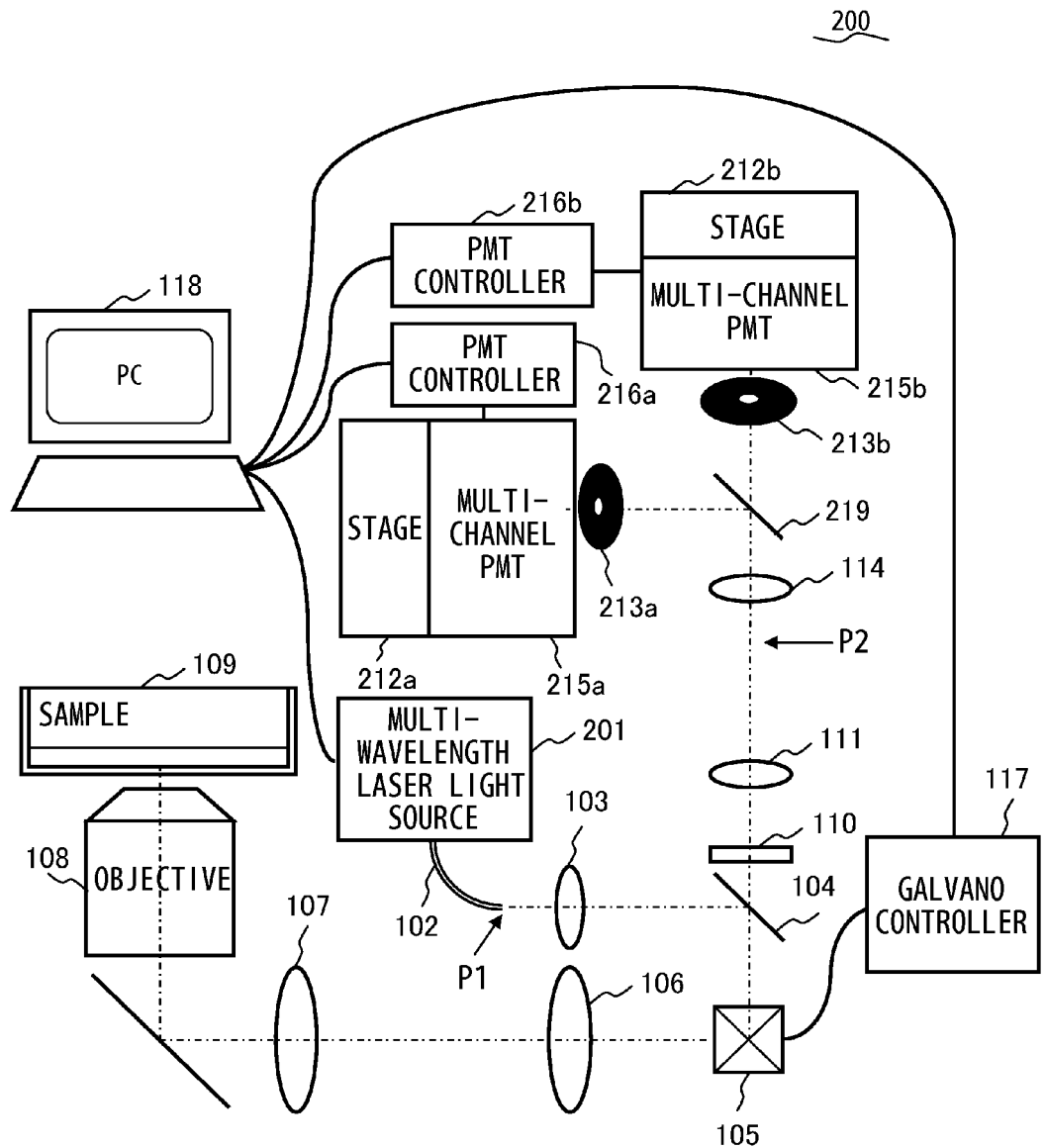
F I G. 18

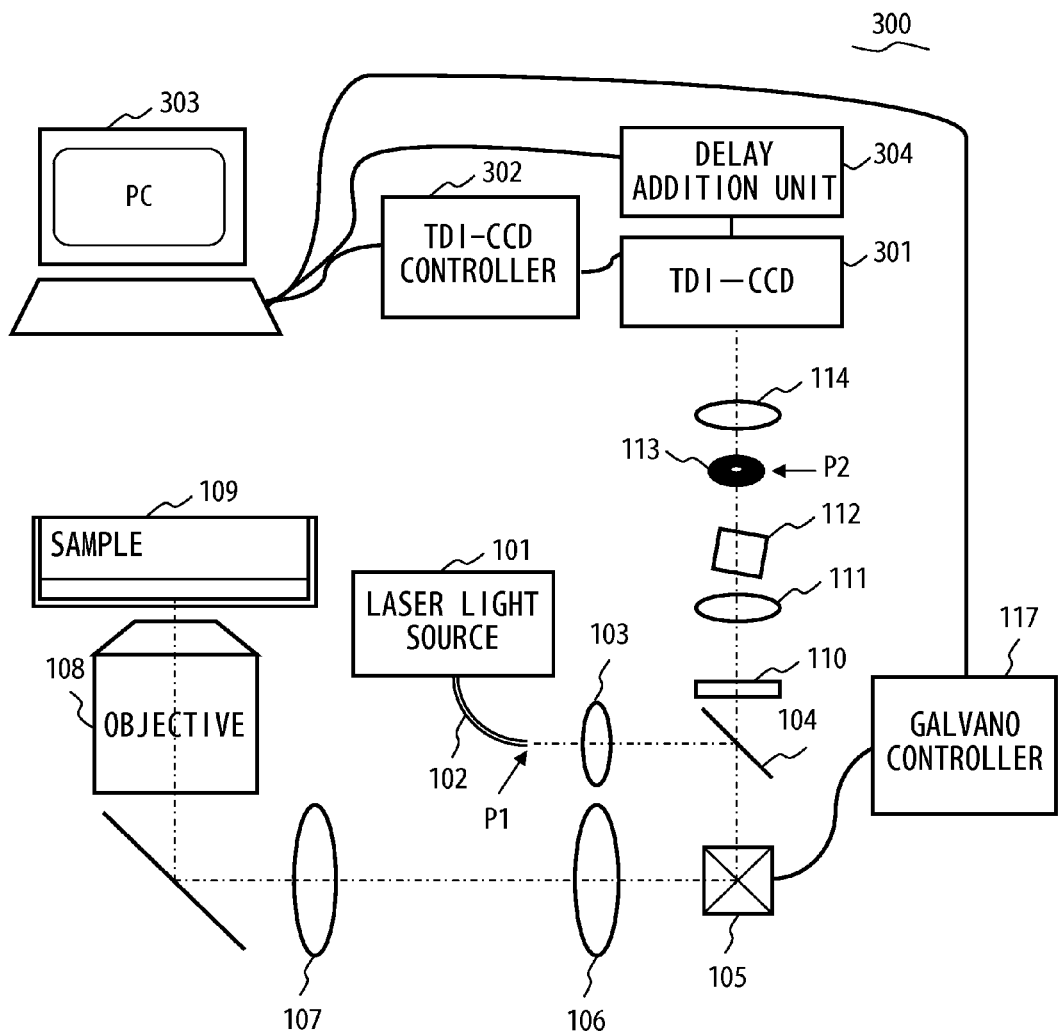
F I G. 19

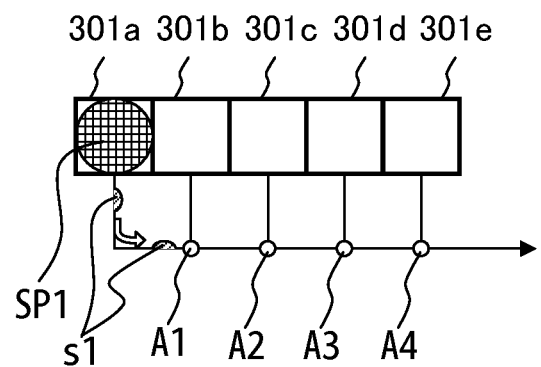
F I G. 20B

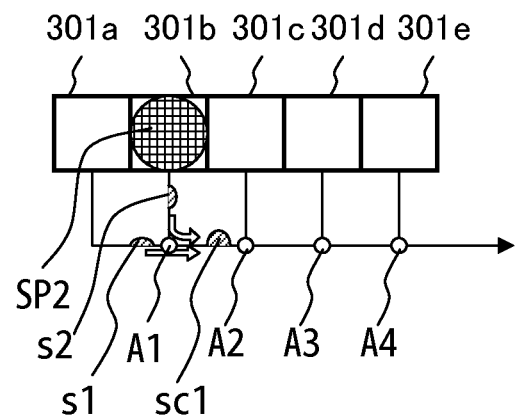
F I G. 2 0 C

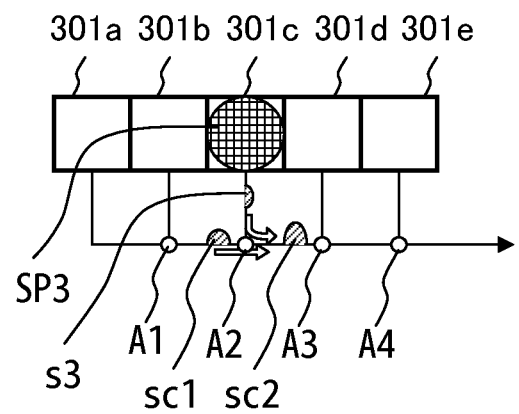
F I G. 20D

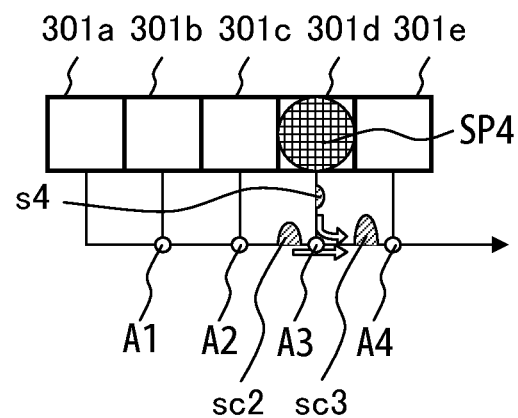
F I G. 20E

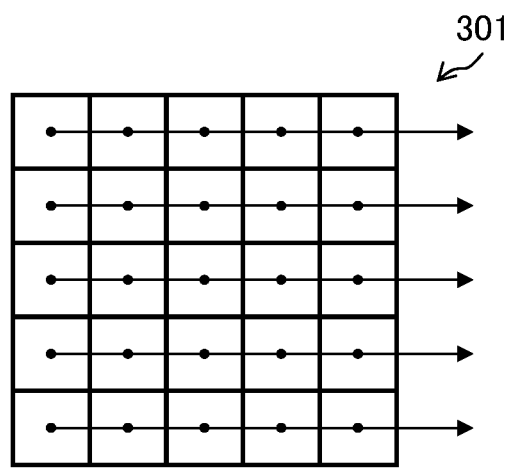
F I G. 20G

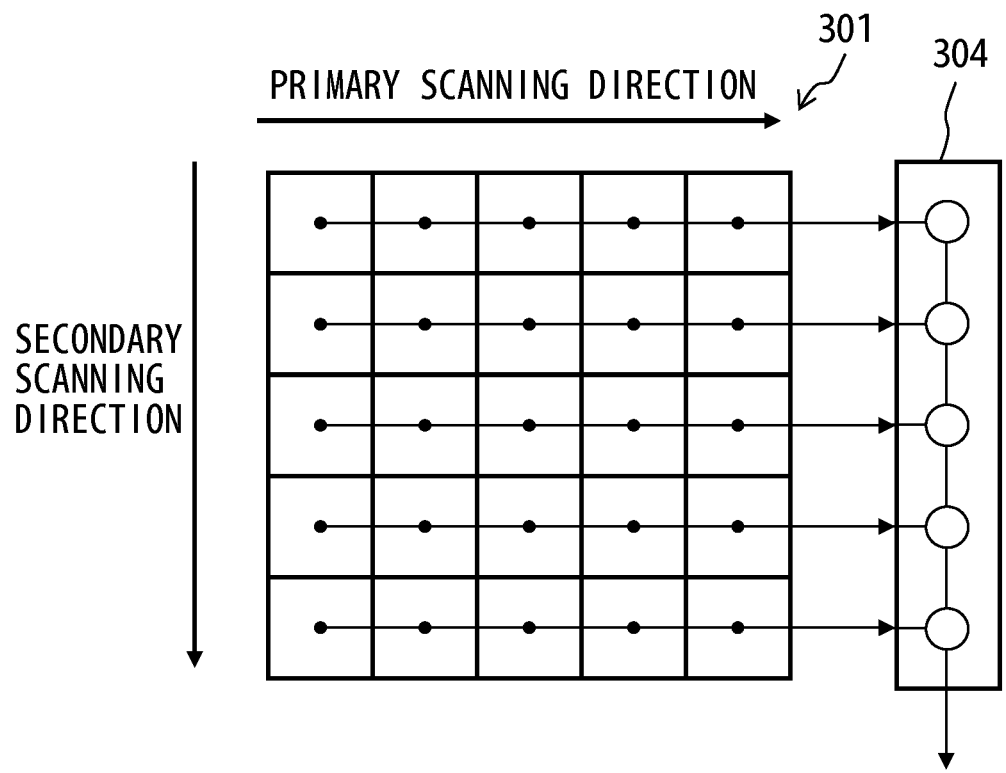
F I G. 2 1

CONFOCAL IMAGE GENERATION APPARATUS

CROSS-REFERENCE TO RELATED APPLICATIONS

This application is based upon and claims the benefit of priority from prior Japanese Patent Application No. 2013-122678, filed Jun. 11, 2013, the entire contents of which are incorporated herein by reference.

BACKGROUND OF THE INVENTION

1. Field of the Invention

The present invention relates to a confocal image generation apparatus, and in particular, it relates to a confocal image generation apparatus for generating a confocal image with visualized super-resolution components.

2. Description of the Related Art

A confocal microscope is a kind of a scanning microscope which scans a sample by moving light that was collected at one point on the sample by a scanning means such as a galvano mirror to generate a sample image, and it is widely used in various fields.

There are various setting items in a confocal microscope, such as a pinhole diameter, a PMT (Photomultiplier Tube) voltage, an output intensity or wavelength of a light source, scanning speed, and the like, and an image quality may significantly change with these settings.

It is known that with regard to the pinhole diameter among such settings, when the pinhole diameter is made sufficiently small with respect to an Airy disk diameter, a resolution component that exceeds a cut-off frequency of an optical system (hereinafter referred to as a super-resolution component) is obtained. Such a technology is disclosed, for example, in Non-Patent Document (T. Wilson and C. Sheppard, "Theory and Practice of Scanning Optical Microscopy", Academic Press, 1984, Chapter VI, Section 6).

SUMMARY OF THE INVENTION

One aspect of the present invention provides a confocal image generation apparatus including a laser light source configured to emit an excitation light for exciting a sample; an objective configured to irradiate the sample by collecting the excitation light and to take in fluorescence generated from the sample by an irradiation of the excitation light; an optical path branch element configured to branch an optical path of the excitation light and an optical path of the fluorescence disposed on an optical path between the laser light source and the objective; a scanning optical system configured to shift a light collecting position of the excitation light on a focal plane of the objective in a direction that is orthogonal to an optical axis of the objective, the scanning optical system being disposed on an optical path between the objective and the optical path branch element; an optical detector having a plurality of light-receiving elements, in which the plurality of light-receiving elements are two-dimensionally arrayed with a pitch that is shorter than a diameter of an Airy disk of the fluorescence formed on an imaging plane, so that a light-receiving surface is positioned on an optical path of the fluorescence that is branched from an optical path of the excitation light and on the imaging plane that is optically conjugate with the focal plane; and an image operation unit configured to generate a confocal image of the sample in which a super-resolution component is emphasized on the basis of a signal that is output from the plurality of light-receiving elements, the super-resolution component being a frequency component that exceeds a cut-off frequency of the objective, which is determined by a numerical aperture of the objective and a wavelength of the fluorescence.

Another aspect of the present invention provides a confocal image generation apparatus including an excitation light generation means configured to generate an excitation light for exciting a sample; an objective configured to irradiate the sample by collecting the excitation light and to take in fluorescence generated from the sample by an irradiation of the excitation light; an optical path branch means configured to branch an optical path of the excitation light and an optical path of the fluorescence disposed on an optical path between the excitation light generation means and the objective; a scanning means configured to shift a light collecting position of the excitation light on a focal plane of the objective in a direction that is orthogonal to an optical axis of the objective, the scanning means being disposed on an optical path between the objective and the optical path branch means; an optical detection means having a plurality of light-receiving elements, in which the plurality of light-receiving elements are two-dimensionally arrayed with a pitch that is shorter than a diameter of an Airy disk of the fluorescence formed on an imaging plane, so that a light-receiving surface is positioned on the imaging plane that is on an optical path of the fluorescence that is branched from an optical path of the excitation light and that is optically conjugated with the focal plane; and an image operation means configured to generate a confocal image of the sample in which a super-resolution component is emphasized on the basis of a signal that is output from the plurality of light-receiving elements, the super-resolution component being a frequency component that exceeds a cut-off frequency of the objective which is determined by a numerical aperture of the objective and a wavelength of the fluorescence.

BRIEF DESCRIPTION OF THE DRAWINGS

The present invention will be more apparent from the following detailed description when the accompanying drawings are referenced.

FIG. 2 is a drawing for explaining a barycentric position of a point spread function of a light-receiving element.

FIG. 3 is a drawing which illustrates a barycentric position of a point spread function of each of the light-receiving elements before correcting a barycentric position.

FIG. 4 is a drawing which illustrates a barycentric position of a point spread function of each of the light-receiving elements after correcting a barycentric position.

FIG. 6 is a drawing which illustrates a second embodiment of a configuration that may be employed by an image operation unit.

FIG. 13 is a drawing which illustrates a relationship between a division number of a fluorescence Airy disk and a full width half maximum of a point spread function of an apparatus.

FIG. 14 is a drawing which exemplifies a configuration of a confocal image generation apparatus according to embodiment 1.

FIG. 15 is a drawing which illustrates a flow of an entire process that is executed by a confocal image generation apparatus according to embodiment 1.

FIG. 18 is a drawing which exemplifies a configuration of a confocal image generation apparatus according to embodiment 2.

FIG. 19 is a drawing which exemplifies a configuration of a confocal image generation apparatus according to embodiment 3.

FIG. 20A to FIG. 20G are drawings for explaining an operation of a TDI-CCD.

FIG. 21 is a drawing which illustrates a relationship between a TDI-CCD and a delay adder.

DESCRIPTION OF THE EMBODIMENTS

Figure 1:
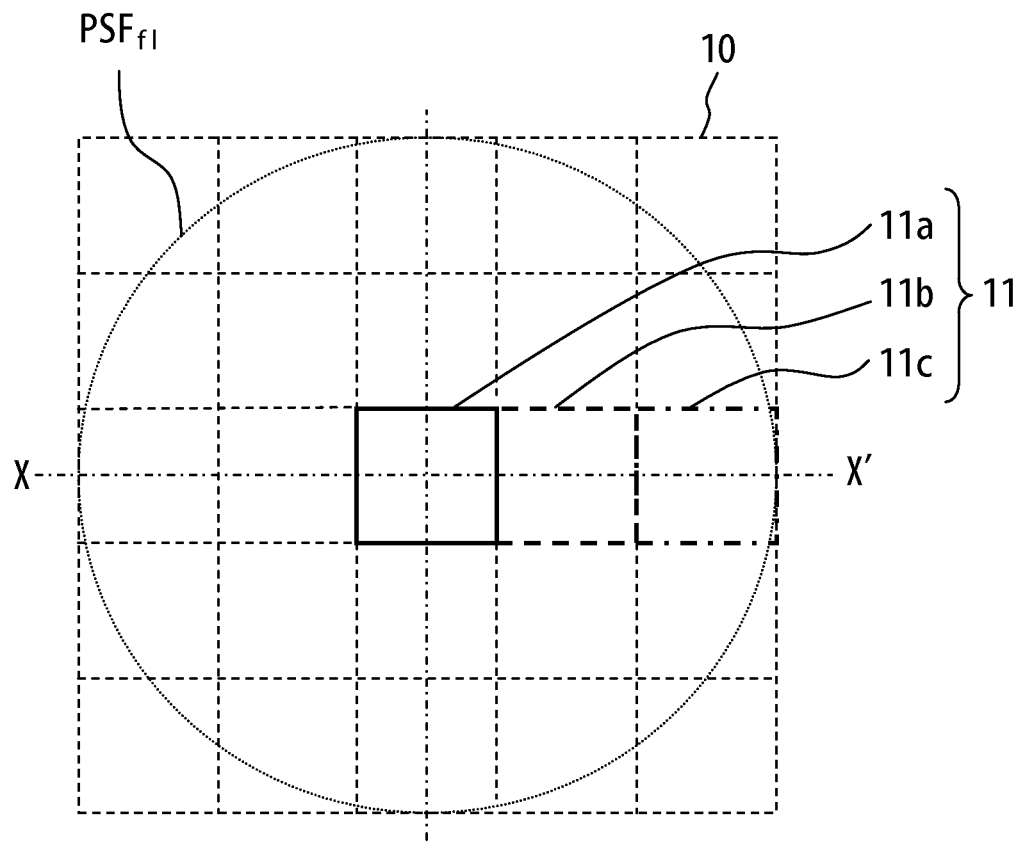
FIG. 1 is a drawing which illustrates a relationship between a two-dimensionally arrayed detector and a fluorescence spot.

In the meantime, when a pinhole diameter is too much narrowed with respect to an Airy disk diameter in a confocal microscope to obtain a super-resolution component, a light intensity detected by a detector seriously decreases. As a consequence, an S/N ratio of a confocal image becomes significantly reduced.

On the other hand, when a pinhole diameter is set to around an Airy disk diameter in order to give higher priority to securing of a detection efficiency, a super-resolution component included in a light that is detected by a detector becomes extremely weak. Since a super-resolution component is not visualized, a super-resolution image cannot be obtained.

Hereafter, explanations are given for embodiments of the present invention.

First, general explanations are given for an Image Scanning Microscopy (hereinafter referred to as an ISM).

As described in Non-Patent Document (Claus B. Müller and Jörg Enderlein, "Image Scanning Microscopy", Physical Review Letters, 14 May 2010, Vol. 104, pp 198101-1 to 198101-4), an ISM is a microscopy which combines detection by a regional division with a conventional confocal microscopy. A confocal microscope used for an ISM (hereinafter referred to as an ISM apparatus) differs from a conventional confocal microscope in that an ISM apparatus includes a two-dimensionally arrayed detector in which a plurality of light-receiving elements are arrayed two-dimensionally at a position that is optically conjugated with a focal plane of an objective, while the conventional confocal microscope includes only one light-receiving element.

An ISM apparatus generates one confocal image by generating confocal images from a signal of each of the light-receiving elements (channels) of a two-dimensionally arrayed detector and correcting origin positions of a plurality of generated confocal images to synthesize them. Hereafter, a confocal image generated for each channel is referred to as a confocal image element, and a confocal image generated by synthesizing confocal image elements is referred to as a synthesized confocal image. Each of a plurality of light-receiving elements provided in the two-dimensionally arrayed detector functions similarly to a confocal pinhole of a conventional confocal microscope. With this, a high resolution similar to when a confocal pinhole diameter is narrowed is realized in a synthesized confocal image generated at an ISM.

Detailed explanations are given, in reference to FIG. 1 to FIG. 4, for obtaining a confocal image (synthesized confocal image) with a high resolution by using an ISM.

A point spread function (PSF: Point Spread Function) indicating image formation characteristics of a general confocal microscope used for a fluorescence observation is represented by expression (1).

$$PSF_{LSM}(r) = PSF_{ex}(r) \times \{PSF_{fl}(r) \otimes PH(r)\} \quad (1)$$

(in which $\otimes$ is a convolution operator)

Here, $PSF_{LSM}$ is a point spread function (PSF: Point Spread Function) indicating image formation characteristics of a confocal microscope. $PSF_{ex}$ is a PSF of a spot of an excitation light and indicates light collecting characteristics when the excitation light is collected on a sample surface. $PSF_{fl}$ is a PSF of a spot of fluorescence and indicates image formation characteristics when fluorescence generated from a sample surface forms an image on an imaging plane. All $PSF_{LSM}$, $PSF_{ex}$, and $PSF_{fl}$ are functions defined on a sample surface. PH is a function in which a transmission function of a confocal diaphragm having a confocal pinhole is projected on a sample surface. r is a distance from an optical axis in the sample surface.

As illustrated in expression (1), $PSF_{LSM}$, which is a point spread function of a confocal microscope, changes with the transmission function PH of the confocal diaphragm, that is, with a pinhole diameter. More specifically, as the pinhole diameter gets narrower, a full width half maximum (FWHM) of the point spread function $PSF_{LSM}$ of the confocal microscope gets narrower to get close to the limit value $PSF_{ex}(r) \times PSF_{fl}(r)$. As a consequence, an intensity of a high-frequency component of a modulation transfer function (MTF: Modulation Transfer Function) $MTF_{LSM}$ that is a Fourier transformation of the $PSF_{LSM}$ increases. Accordingly, in the confocal microscope, as the pinhole gets narrower, a higher frequency component can be detected, and as a consequence, a confocal image with a high resolution can be obtained.

On the other hand, in the ISM apparatus, a fluorescence spot (an extent of the $PSF_{fl}$ projected on an imaging plane, that is, an Airy disk) is formed on a light-receiving surface (imaging plane) across a plurality of light-receiving elements 11 that the two-dimensionally arrayed detector 10 has, as illustrated in FIG. 1. As a consequence, a confocal image (confocal image element) for each light-receiving element 11 is generated from a signal from each light-receiving element 11 and information on a scanning position of a scanning means such as a galvano mirror and the like. Accordingly, in the ISM apparatus, $PSF_{LSM}$ is also defined for each light-receiving element 11. In the meantime, an image in which the two-dimensionally arrayed detector 10 is projected on the sample surface is illustrated in FIG. 1.

A plurality of light-receiving elements each of which functions similarly to a confocal pinhole have the same size and the size is sufficiently smaller than a fluorescence spot diameter (Airy disk diameter). Accordingly, an FWHM of $PSF_{LSM}$ of a plurality of light-receiving elements has a constant value, such as when a pinhole is sufficiently narrowed in a confocal microscope.

However, since a position at which PH is allocated differs for each light-receiving element, a barycentric position of $PSF_{LSM}$ of each light-receiving element is not the same. For example, when focusing on a light-receiving element 11c, as illustrated in FIG. 2, $PSF_{ex}$ is spread around a center position of the two-dimensionally arrayed detector 10. On the other hand, $PSF_{fl}$ and a convolution of PH of the light-receiving element 11c are spread around the light-receiving element 11c. As a result, a barycentric position of $PSF_{LSM(c)}$ of the light-receiving element 11c is shifted from a center position of the two-dimensionally arrayed detector 10. Generally, the shift amount is a value in which a value corresponding to half of a distance from a center position of the two-dimensionally arrayed detector 10 to a center position of the light-receiving element 11c, that is, about half of a coordinate of a center position of the light-receiving element 11c when specifying a center position of the two-dimensionally arrayed detector 10 as an origin, is divided by a projection magnification from a sample surface to an imaging plane.

Accordingly, a barycentric position of $PSF_{LSM}$ of each light-receiving element ($PSF_{LSM(a)}$ of a light-receiving element 11a, $PSF_{LSM(b)}$ of a light-receiving element 11b, and $PSF_{LSM(c)}$ of the light-receiving element 11c) differs in accordance with the position of the light-receiving element, as illustrated in FIG. 3. Therefore, when the confocal image elements generated by a plurality of light-receiving elements are synthesized as-is to generate a synthesized confocal image, the FWHM of $\Sigma PSF_{LSM}$ which indicates an image formation performance of an entire apparatus becomes large, even though the FWHM of $\Sigma PSF_{LSM}$ of each light-receiving element is small. The $\Sigma PSF_{LSM}$ has a value that is almost the same as $PSF_{LSM}$ of a conventional confocal microscope when setting the pinhole diameter to be almost the same as the fluorescence spot diameter.

Considering the above, the ISM apparatus corrects confocal image elements so that the origin position of a confocal image element generated at each light-receiving element is matched up with the origin position of a specific light-receiving element (for example, the light-receiving element 11a positioned at a center of the two-dimensionally arrayed detector 10). Subsequently, the ISM apparatus synthesizes these confocal image elements to generate a synthesized confocal image. In this case, with a correction, barycentric positions of the $PSF_{LSM}$ ($PSF_{LSM(a)}$ of the light receiving element 11a, $PSF_{LSM(b)}$ of the light receiving element 11b, and $PSF_{LSM(c)}$ of the light-receiving element 11c, or the like) of each light-receiving element are matched up with each other, as illustrated in FIG. 4. As a consequence, the FWHM of $\Sigma PSF_{LSM}$ (in other words, the $PSF_{LSM}$ of a synthesized confocal image) of the ISM apparatus is kept small, at a value that is almost the same as the FWHM of $PSF_{LSM}$ (in other words, the $PSF_{LSM}$ of each confocal image element) of each light-receiving element.

Therefore, in the ISM apparatus, a high-frequency component can be detected, similar to when the pinhole of the confocal microscope is sufficiently narrowed, and a synthesized confocal image with a high resolution can be obtained. Further, unlike when the pinhole of the confocal microscope is sufficiently narrowed, in the ISM apparatus, fluorescence is detected, without waste, by an entire light-receiving element. That is to say, since no fluorescence incident on an optical detector is blocked for detecting a high-frequency component, fluorescence can be efficiently detected by the optical detector. Therefore, a synthesized confocal image with less noise and with a high S/N ratio can be obtained.

Next, general explanations are given for the ISM apparatus according to each embodiment of the present invention.

The ISM apparatus according to each embodiment of the present invention includes at least a microscope main body including an optical detector (two-dimensionally arrayed detector 10) and an image operation unit that is an image operation means for generating a confocal image on the basis of a signal that is output from the optical detector (two-dimensionally arrayed detector 10). In the ISM apparatus, digital filter processing (hereinafter referred to as super-resolution filter processing) is performed at the image operation unit for emphasizing a super-resolution component included in the confocal image. With this, a confocal image in which the super-resolution component is preferably visualized is generated. In the meantime, a super-resolution component is a frequency component that exceeds a cut-off frequency of an objective to be used. The cut-off frequency $f_c$ of an objective is represented by the following expression.

$$f_c = \frac{2NA}{\lambda_{fl}} \qquad (2)$$

Here, $\lambda_{fl}$ is a fluorescence wavelength and NA is a numerical aperture of the objective. Further, among confocal images, those with emphasized super-resolution components are specifically referred to as super-resolution images.

Figure 5:
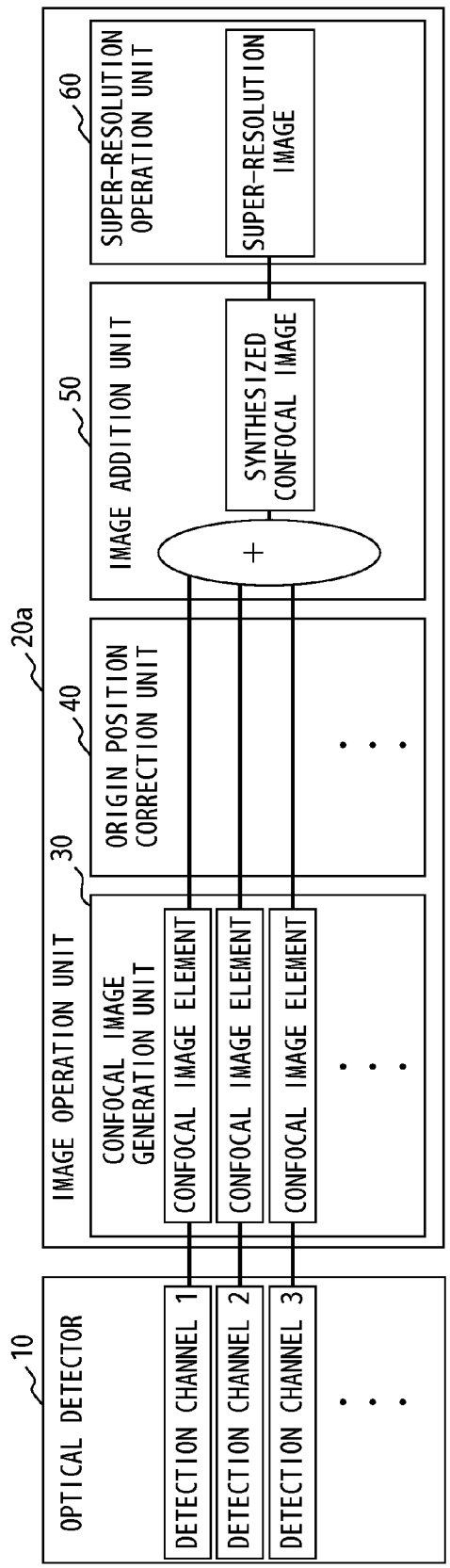
FIG. 5 is a drawing which illustrates a first embodiment of a configuration that may be employed by an image operation unit.
Figure 7:
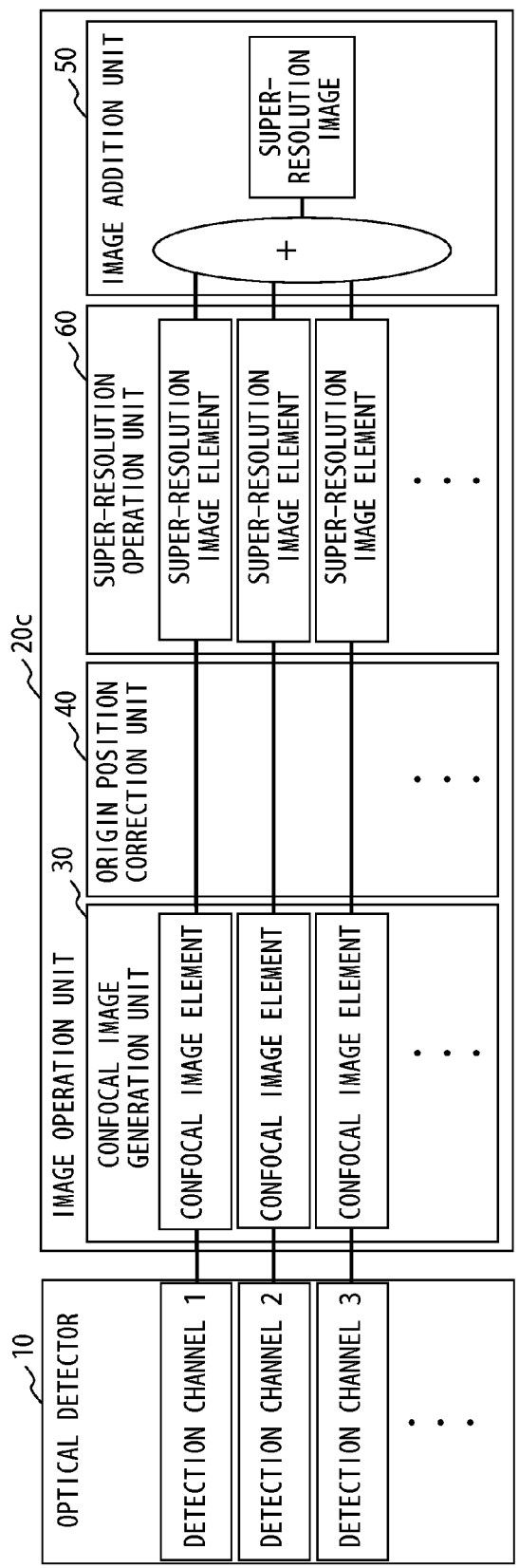
FIG. 7 is a drawing which illustrates a third embodiment of a configuration that may be employed by an image operation unit.

In reference to FIG. 5 to FIG. 7, explanations are given for a configuration that may be employed by an image operation unit included in the ISM apparatus according to each embodiment of the present invention.

As illustrated in FIG. 5 to FIG. 7, an image operation unit (image operation unit 20a, image operation unit 20b, and image operation unit 20c) which generates a super-resolution image has a confocal image generation unit 30 which generates a plurality of confocal image elements on the basis of a signal from a plurality of light-receiving elements 11 (detection channels), an origin position correction unit 40 which corrects an origin position of a plurality of confocal image elements generated at the confocal image generation unit 30, an image addition unit 50 which adds a plurality of confocal image elements with the origin position thereof having been corrected at the origin position correction unit 40 to generate a synthesized confocal image of a sample, and a super-resolution operation unit 60 which emphasizes a super-resolution component.

In the meantime, as illustrated in FIG. 5, a super-resolution operation unit 60 may emphasize a super-resolution component with respect to a synthesized confocal image generated at the image addition unit 50 to generate a super-resolution image. In addition, as illustrated in FIG. 6, a super-resolution operation unit 60 may emphasize a super-resolution component with respect to each of a plurality of confocal image elements generated at the confocal image generation unit 30 to generate a plurality of super-resolution image elements. Further, as illustrated in FIG. 7, a super-resolution operation unit 60 may emphasize a super-resolution component with respect to each of a plurality of confocal image elements, with the origin position thereof having been corrected at the origin position correction unit 40 to generate a plurality of super-resolution image elements.

When image operation units illustrated in FIG. 5 to FIG. 7 are compared, a comparison result is as follows. In an image operation unit 20a illustrated in FIG. 5, a super-resolution operation unit 60 may perform super-resolution filter processing on one image (a synthesized confocal image), and accordingly, it has a good efficiency for super-resolution filter processing. Therefore, the image operation unit 20a can shorten a time for super-resolution filter processing that is necessary for generating one super-resolution image. In an image operation unit 20b illustrated in FIG. 6 and an image operation unit 20c illustrated in FIG. 7, super-resolution filter processing is performed on each of the confocal image elements, and by adding the super-resolution image elements thereto, a super-resolution image is generated. Therefore, it may adjust a coefficient used for addition in accordance with a signal intensity and a noise level that each of super-resolution image elements has. With this, the image operation unit 20b and the image operation unit 20c can restrain a noise component that is included in the super-resolution image. Further, in the image operation unit 20b illustrated in FIG. 6, since a correction of an origin position of each image element is performed by the origin position correction unit 40 after super-resolution filter processing, a correction accuracy of an origin position of each image element is never deteriorated by the super-resolution filter processing. Therefore, the image operation unit 20b can prevent deterioration in accuracy in correcting the origin position.

The origin position correction unit 40 corrects an origin position of a plurality of confocal image elements so as to be closer to, and more preferably, matched up with, a projection position of a sample of a confocal image element generated on the basis of a signal from a specific light-receiving element, or more specifically, a signal from a light-receiving element (light-receiving element 11a illustrated in FIG. 1) positioned at a center of a plurality of light-receiving elements. In other words, the origin position correction unit 40 corrects the $PSF_{LSM}$ of a plurality of confocal image elements so that a barycentric position of the $PSF_{LSM}$ of a plurality of confocal image elements is closer to, and more preferably, matched up with, a barycentric position of the $PSF_{LSM}$ of a confocal image element generated on the basis of the signal from the light-receiving element 11a.

With the correction mentioned above, as a distance from a center position of the light-receiving element 11a to a center position of the light-receiving element which corresponds to a confocal image element that is a correction target gets longer, the origin position of the confocal image element is corrected to a greater extent. More specifically, it is desirable that the origin position correction unit 40 correct the origin position of the confocal image element by a distance on the confocal image element that is a correction target which corresponds to half of a distance from the center position of the light-receiving element 11a to the center position of the light-receiving element which corresponds to the confocal image element that is the correction target, for example. More detailed explanations are given for this point.

First, when assuming that an aperture of each light-receiving element of the optical detector is sufficiently smaller compared with $PSF_{LSM}$, $PSF_{LSM}$ of the light-receiving element is represented by the following expression (4), since a transmission function PH is approximated by a δ function of Dirac represented in the following expression (3). Here, $x_p$ and $y_p$ respectively illustrate a central coordinate in an X direction and Y direction of an aperture image in which an aperture of a light-receiving element is projected on a sample surface, respectively.

$$PH \cong \delta(x-x_p)\delta(y-y_p) \quad (3)$$

$$PSF_{LSM}(x,y) = PSF_{ex}(x,y) \times PSF_{fl}(x-x_p, y-y_p) \quad (4)$$

Here, $PSF_{ex}$ is represented by the following expression (5) when it is approximated by a Gaussian distribution having the FWHM of $_{ex}$. $PSF_{fl}$ is represented by the following expression (6) when it is approximated by a Gaussian distribution having the FWHM of $_{fl}$.

$$PSF_{ex} \cong \exp\left[-4\log 2 \cdot \left(\frac{(x^2+y^2)}{\Delta_{ex}^2}\right)\right] \quad (5)$$

$$PSF_{fl} \cong \exp\left[-4\log 2 \cdot \left(\frac{(x^2+y^2)}{\Delta_{fl}^2}\right)\right] \quad (6)$$

When expression (4) is transformed by using expressions (5) and (6), $PSF_{LSM}$ is transformed as represented in the following expression (7).

$$PSF_{LSM}(x,y) = \exp\left[-4\log 2 \cdot \left(\frac{x_p^2+y_p^2}{\Delta_{ex}^2+\Delta_{fl}^2}\right)\right] \quad (7)$$

$$\exp\left[-4\log 2 \cdot \frac{\left(x-\frac{\Delta_{ex}^2}{\Delta_{ex}^2+\Delta_{fl}^2}x_p\right)^2+\left(y-\frac{\Delta_{ex}^2}{\Delta_{ex}^2+\Delta_{fl}^2}y_p\right)^2}{\left(\frac{\Delta_{ex}\Delta_{fl}}{\sqrt{\Delta_{ex}^2+\Delta_{fl}^2}}\right)^2}\right]$$

As is clear from expression (7), the $FWHM_{LSM}$ of $PSF_{LSM}$ of a light-receiving element is represented by the following expression (8), and it is constant regardless of an aperture coordinate or a light-receiving element.

$$\Delta_{LSM} = \frac{\Delta_{ex}\Delta_{fl}}{\sqrt{\Delta_{ex}^2+\Delta_{fl}^2}} \quad (8)$$

As is also clear from expression (7), a barycentric coordinate $(x_p, y_p)$ of $PSF_{LSM}$ of a light-receiving element is represented by the following expression (9).

$$(X_P, Y_P) = \frac{\Delta_{ex}^2}{\Delta_{ex}^2+\Delta_{fl}^2}(x_p, y_p) \equiv \alpha(x_p, y_p) \quad (9)$$

In a fluorescence observation, since a difference between $_{ex}$ and $_{fl}$ is generally as small as about 10%, α in expression (9) is about 0.5. Therefore, as illustrated in FIG. 2, a barycentric position of $PSF_{LSM}$ of each light-receiving element (confocal image element) is positioned almost the midpoint between a barycentric position of $PSF_{ex}$ (center position of a light-receiving element 11a in FIG. 2) and a barycentric position of a convolution of $PSF_{fl}$ and PH of a light-receiving element (center position of a light-receiving element 11c in FIG. 2).

Therefore, as mentioned above, the origin position correction unit 40 may correct the origin position of the confocal image element by a distance on the confocal image element that corresponds to α times (half) of a distance from a center position of a two-dimensionally arrayed detector 10 to a center position of the light-receiving element which corresponds to the confocal image element that is a correction target. Roughly, the origin position correction unit 40 may correct the origin position of the confocal image element by a distance on the confocal image element that corresponds to half of a distance from the center position of the two-dimensionally arrayed detector 10 to the center position of the light-receiving element which corresponds to the confocal image element that is a correction target. That is to say, a correction amount is an integral multiple of a distance on an image which corresponds to half of a pitch of the light-receiving element in respective vertical and horizontal directions of the confocal image element.

As the origin position correction unit 40 utilizes the correction amount determined on the basis of the position of the light-receiving element and performs processing as mentioned above, processing of calculating $PSF_{LSM}$ of each light-receiving element (confocal image element) and processing of further calculating its barycentric position can be omitted. Thus, a calculation amount for correction processing performed at the origin position correction unit 40 can significantly be reduced, and as a result, the correction processing can be sped up.

In the meantime, considering that a correction amount at the origin position correction unit 40 is an integral multiple of a distance on an image which corresponds to a times (about half) of a pitch of the light-receiving element, it is desirable to set each pixel pitch on the confocal image as a times (about half) of a pitch of the light-receiving element of the two-dimensionally arrayed detector 10 that is projected on the sample surface. Roughly, each pixel pitch may be set as half of a pitch of the light-receiving element of the two-dimensionally arrayed detector 10 that is projected on the sample surface. By setting the pixel pitch as mentioned above, processing can performed at a high speed, since the correction at the origin position correction unit 40 can be attained only by a pixel shift.

An image addition unit 50 adds a plurality of confocal image elements (which may include super-resolution image elements) to generate a synthesized confocal image (which may include a super-resolution image). However, an image addition unit 50 does not necessarily add all confocal image elements and the image addition unit 50 may select confocal image elements to be added in accordance with a prescribed criterion.

Figure 8:
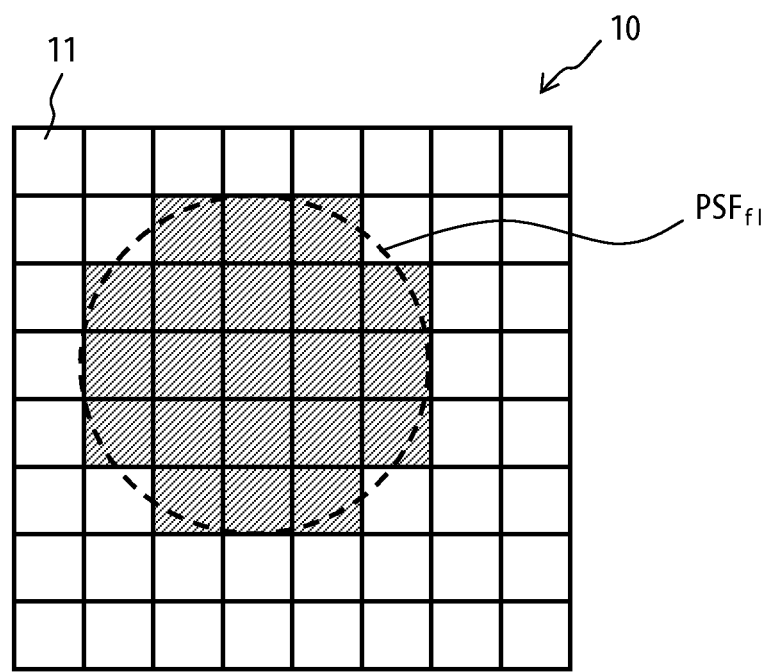
FIG. 8 is a drawing for explaining a confocal image element that should be added at an image addition unit.

For example, the image addition unit 50 may add only confocal image elements generated on the basis of a signal from the light-receiving element 11 that output a signal with an intensity that exceeds a prescribed value, from among a plurality of confocal image elements in which the origin position thereof was corrected at the origin position correction unit 40, to generate a synthesized confocal image. In addition, as illustrated in FIG. 8, the image addition unit 50 may add only confocal image elements generated on the basis of a signal from the light-receiving element 11 that has a light-receiving surface within a region of a fluorescence Airy disk (an extent of $PSF_{fl}$ projected on an imaging plane) formed on an imaging plane (light-receiving surface of a two-dimensionally arrayed detector 10) from among a plurality of confocal image elements in which the origin position thereof was corrected at the origin position correction unit 40, to generate a synthesized confocal image. More precisely, FIG. 8 illustrates an embodiment of adding confocal image elements generated on the basis of a signal from the light-receiving element 11 in which a center of the light-receiving element is within a region of a fluorescence Airy disk.

Although the S/N ratio of the confocal image element generated on the basis of a weak signal is in general low, signal intensity increases by adding a plurality of confocal image elements. Therefore, by increasing the number of the confocal image elements to be added, the S/N ratio of the synthesized confocal image can be improved. On the other hand, when a total area of a detection aperture of the confocal image elements to be added increases, an optical sectioning ability deteriorates, similarly to when widening the confocal pinhole aperture of the conventional confocal microscope. Accordingly, the number of the confocal image elements to be added can be optimized by adjusting a trade-off of the S/N ratio of the synthesized confocal image and the optical sectioning ability.

The image addition unit 50, instead of or together with selecting the confocal image elements to be added, may determine a weighing coefficient for each light-receiving element, weigh the confocal image element by the weighing coefficient of the corresponding light-receiving element, and add the confocal image element. Alternatively, the image addition unit 50 may add all the confocal image elements to generate the super-resolution image and then newly select the confocal image element to be newly designated as an addition target in view of the result. In this case, for example, a threshold value of signal intensity may be set as low initially, the threshold value being used for judging whether or not the confocal image element is designated as an addition target, and then generation of the super-resolution image and displaying of the generated super-resolution image (for example, its S/N ratio) are repeated while the threshold value is gradually increased. With this, the S/N ratio of the super-resolution image and the optical sectioning ability can be automatically adjusted.

Further, when considering that the origin position is corrected by the pixel shift, it is desirable to further select as many confocal image elements to be added as the number of pixel to be shifted. For example, when it is shifted in the X direction by a maximum of three pixels for correcting the origin position, the image addition unit 50 further selects confocal image elements within additional three columns in the −X direction. With this, a situation can be prevented in which the pixel of a peripheral part of the super-resolution image indicates an abnormal value, since the confocal image element to be additionally-selected by the pixel shift is not obtained. The maximum pixel number to be shifted is determined by the pixel number (the number of confocal image elements that are added at the image addition unit 50) of the super-resolution image. Therefore, a range of the confocal image element that is selected in accordance with the pixel number of the super-resolution image may be expanded. Alternatively, a margin to be provided for a size of a super-resolution image may be set to be relatively larger beforehand.

The super-resolution operation unit 60 performs super-resolution filter processing which emphasizes a super-resolution component of a synthesized confocal image or confocal image elements. Specifically, the super-resolution operation unit 60 emphasizes a super-resolution component, for example, by convolution filter processing that is performed in a real space, or Fourier filter processing that is performed in a frequency space. The super-resolution filter processing performed at the super-resolution operation unit 60 is not limited to processing of emphasizing only a super-resolution component. The processing may emphasize a higher frequency component relative to a lower frequency component, and may preferably emphasize a super-resolution component.

Instead of performing the super-resolution filter processing as mentioned above, the super-resolution operation unit 60 may generate a super-resolution image by using a second synthesized confocal image generated by adding confocal image elements without correcting an origin position. Specifically, the super-resolution operation unit 60 may emphasize a super-resolution component of a first synthesized confocal image by subtracting, from the first synthesized confocal image, a second synthesized confocal image with a certain coefficient multiplied. Since such processing allows for real-time processing, a super-resolution image can be obtained on a real-time basis.

Convolution filter processing and Fourier filter processing are different in that while a high-speed super-resolution operation is possible in the former in general, a noise and a resolution can easily be adjusted in the latter. In the meantime, in accordance with a ratio of a Nyquist frequency of a two-dimensionally arrayed detector 10 and a cut-off frequency of an optical system, a filter coefficient or a filter size used for filter processing may be changed. With this, an effect such as improvement in the super-resolution characteristics and reduction in calculation costs can be expected. More specifically, a coefficient of a convolution filter or that of a Fourier filter may be adjusted in accordance with the number of light-receiving elements to optimize it. Further, a kernel size of the convolution filter can be decreased in accordance with fewer light-receiving elements. With this, a calculation amount can be reduced when the number of the light-receiving elements is small.

Figure 9:
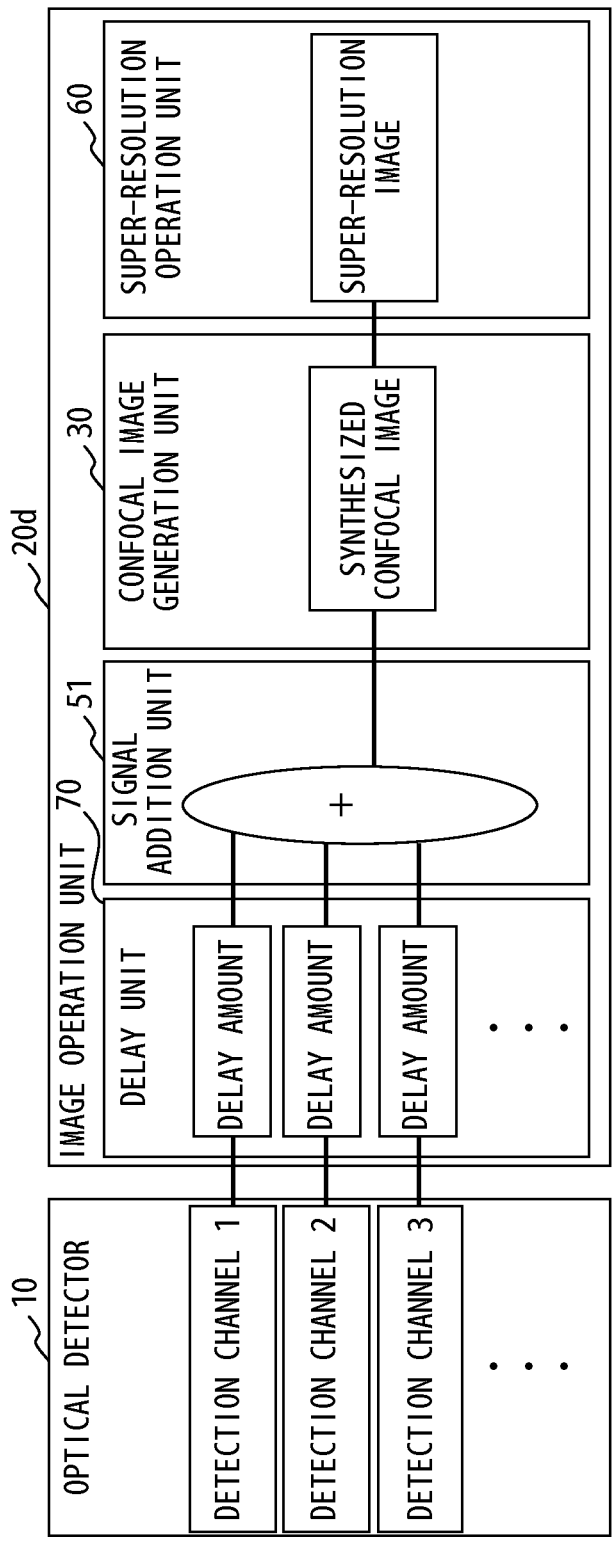
FIG. 9 is a drawing which illustrates a fourth embodiment of a configuration that may be employed by an image operation unit.
Figure 10:
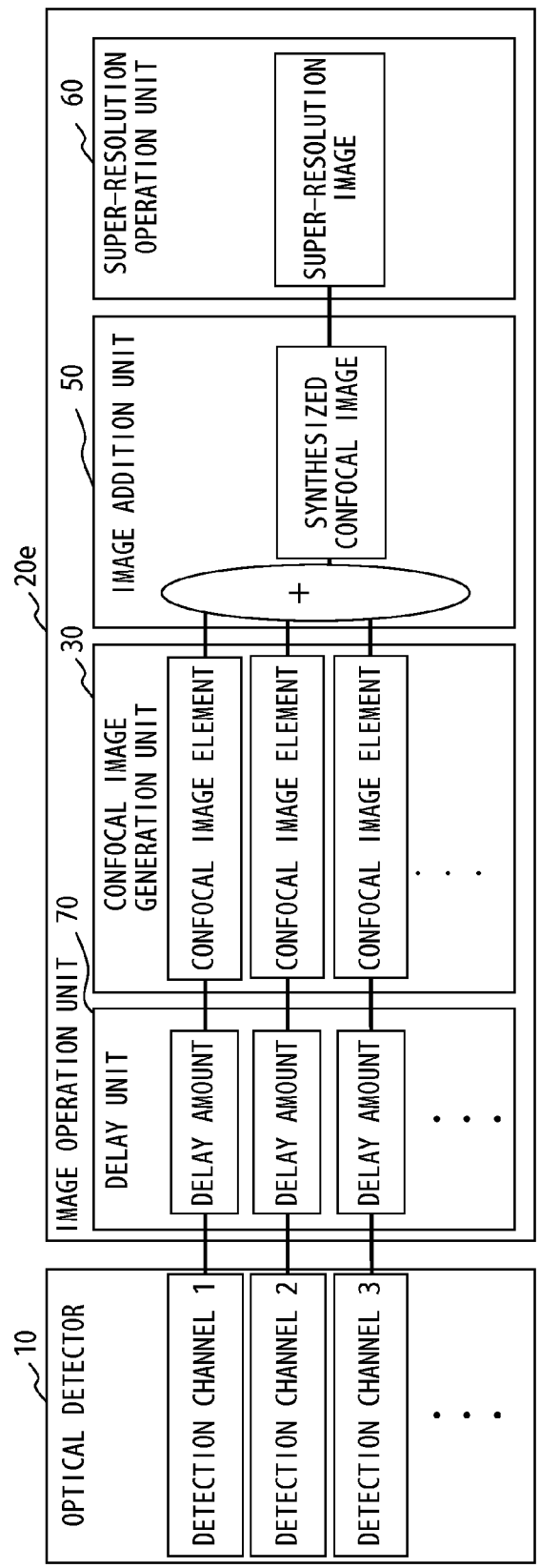
FIG. 10 is a drawing which illustrates a fifth embodiment of a configuration that may be employed by an image operation unit.
Figure 11:
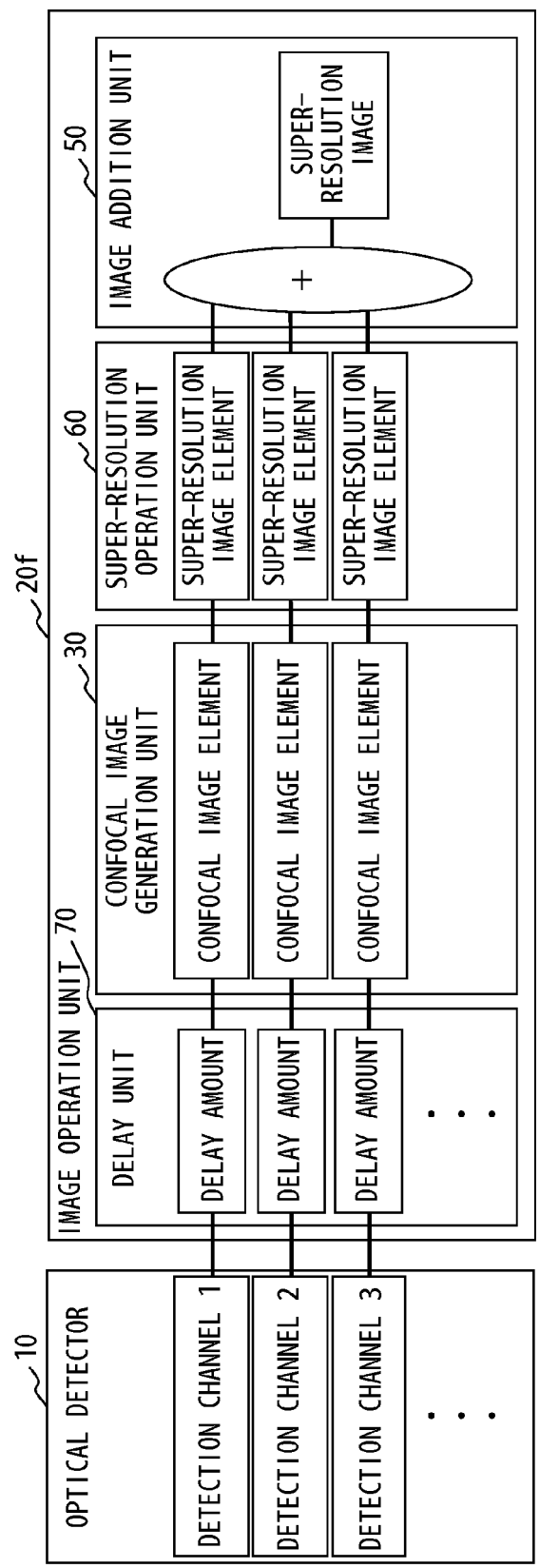
FIG. 11 is a drawing which illustrates a sixth embodiment of a configuration that may be employed by an image operation unit.

Although a configuration has been illustrated so far in which the image operation unit includes the origin position correction unit 40, as illustrated in FIG. 9 to FIG. 11, an image operation unit (image operation unit 20*d*, image operation unit 20*e*, and image operation unit 20*f*), instead of including an origin position correction unit 40, may include a delay unit 70 which delays each signal from a plurality of light-receiving elements by a delay amount in accordance with the light-receiving element that output the signals. The reason is that the position information can be corrected by delaying the signals since the image generated at the ISM apparatus is a confocal image that is obtained by using a scanning means. The image operation unit that includes the delay unit 70 may perform processing by the time delay at the delay unit 70, similar to that of the barycentric correction that is performed by the origin position correction unit 40 on a real-time basis. Therefore, the super-resolution image can be generated at a high speed.

The image operation unit 20*d* illustrated in FIG. 9 includes, in addition to the delay unit 70, a signal addition unit 51 which adds a plurality of signals delayed at the delay unit 70 and outputs an addition signal, a confocal image generation unit 30 which generates a synthesized confocal image from an addition signal output from the signal addition unit 51, and a super-resolution operation unit 60 which emphasizes a super-resolution component with respect to the synthesized confocal image generated at the confocal image generation unit 30. At the image operation unit 20*d*, the confocal image generation unit 30 may generate one confocal image (synthesized confocal image) from the received signal. The super-resolution operation unit 60 may perform super-resolution filter processing on one image (synthesized confocal image). Therefore, the image operation unit 20*d* can shorten the processing time necessary for generating one super-resolution image.

The image operation unit 20*e* illustrated in FIG. 10 includes, in addition to the delay unit 70, a confocal image generation unit 30 which generates a plurality of confocal image elements on the basis of the plurality of signals delayed at the delay unit 70, an image addition unit 50 which adds a plurality of confocal image elements generated at the confocal image generation unit 30 and generates a synthesized confocal image, and a super-resolution operation unit 60 which emphasizes a super-resolution component with respect to the synthesized confocal image generated at the image addition unit 50. At the image operation unit 20*e*, a coefficient may be adjusted that is used when addition is performed in accordance with the signal intensity or noise level of the confocal image element. As a consequence, a noise component included in the synthesized confocal image, and eventually, a noise component included in the super-resolution image can be reduced.

The image operation unit 20*f* illustrated in FIG. 11 includes, in addition to the delay unit 70, a confocal image generation unit 30 which generates a plurality of confocal image elements on the basis of the plurality of signals delayed at the delay unit 70, a super-resolution operation unit 60 which emphasizes a super-resolution component with respect to each of the plurality of confocal image elements generated at the confocal image generation unit 30, and an image addition unit 50 which adds a plurality of super-resolution image elements with the super-resolution component emphasized at the super-resolution operation unit 60 and generates the super-resolution image. At the image operation unit 20*f*, super-resolution filter processing is performed on each of the confocal image elements. Then, a super-resolution image is generated by adding the super-resolution image elements. Therefore, a coefficient may be adjusted that is used when addition is performed in accordance with the signal intensity or noise level of each super-resolution image element. As a result, a noise component included in the super-resolution image can be reduced.

Figure 12:
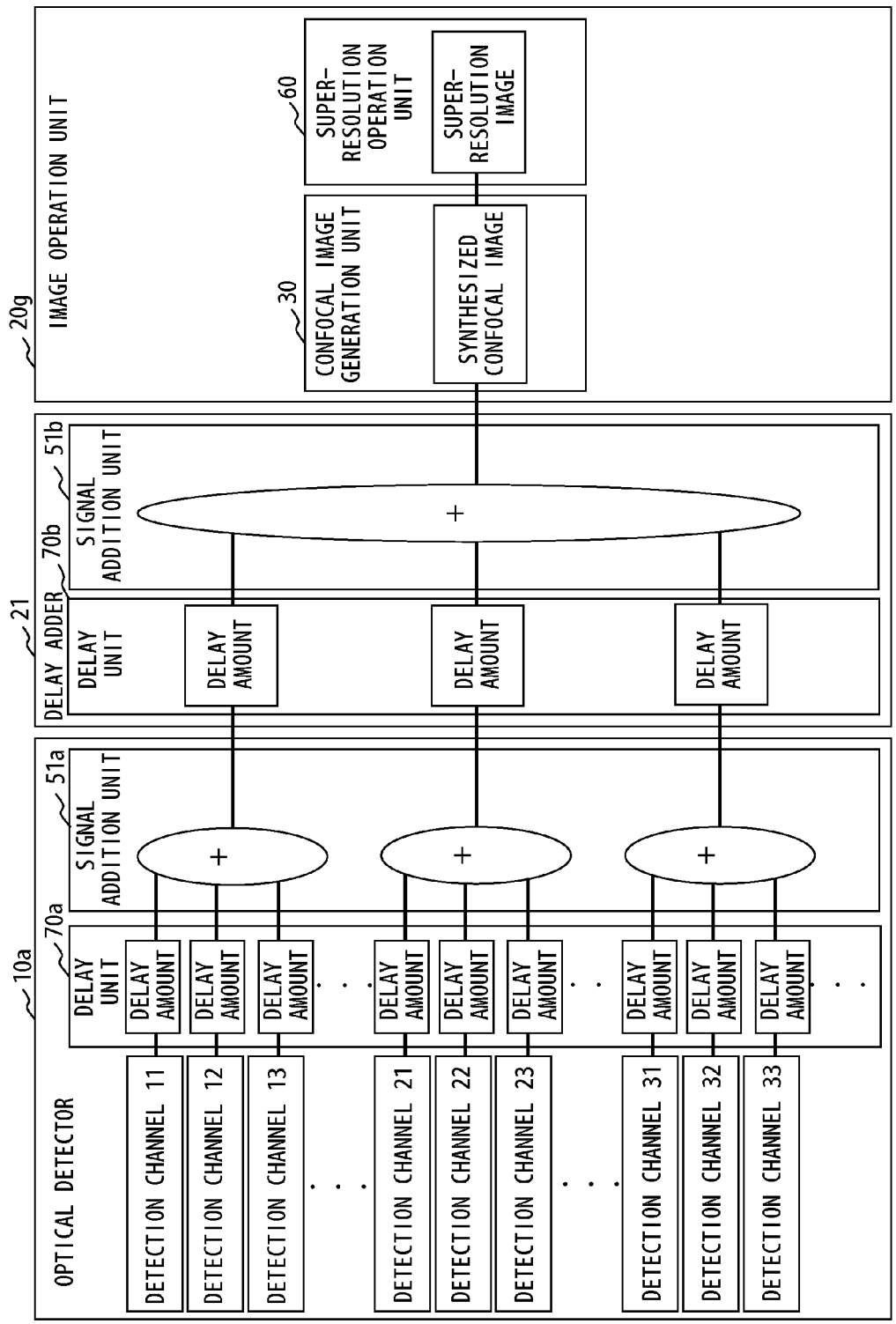
FIG. 12 is a drawing which illustrates one embodiment of a configuration that may be employed by a two-dimensionally arrayed detector.

In addition, as illustrated in FIG. 12, a delay unit may be included outside of the image operation unit. An optical detector (a two-dimensionally arrayed detector 10*a*) illustrated in FIG. 12 includes a delay unit 70*a* and a signal addition unit 51*a*. The signal addition unit 51*a* adds a plurality of signals output from the light-receiving element 11 of the two-dimensionally arrayed detector 10 and delayed at the delay unit 70*a* for each row of the light-receiving elements 11 to output to a delay adder 21. The delay adder 21 illustrated in FIG. 12 includes a delay unit 70*b* which delays signals for each row that were output from the signal addition unit 51*a* by different delay amounts for each row and the signal addition unit 51*b* which adds signals that were output, for each row, from the delay unit 70*b*. Signals for each row output from the two-dimensionally arrayed detector 10 are output from the delay adder 21 as one signal. The image operation unit 20*g* illustrated in FIG. 12 includes a confocal image generation unit 30 which generates a synthesized confocal image from a signal output from the delay adder 21 and a super-resolution operation unit 60 which emphasizes a super-resolution component with respect to the synthesized confocal image generated at the confocal image generation unit 30. In this configuration, a TDI-CCD can be used, for example, as an optical detector.

In the ISM apparatus illustrated in FIG. 9 to FIG. 12 as mentioned above, the delay unit 70 (delay unit 70*a*, delay unit 70*b*) delays each of the signals from a plurality of light-receiving elements with different delay amounts, so that barycentric positions in the time direction of the signal from the plurality of light-receiving elements are matched up. With this, a super-resolution image with the sufficiently visualized super-resolution component can be generated, since an effect similar to the origin position correction unit 40 is obtained.

Explanations are given for a microscope main body that is included in the ISM apparatus according to each embodiment of the present invention.

The microscope main body includes a laser light source that is an excitation light generation means which generates excitation light for exciting a sample and which emits it, an objective which collects an excitation light and irradiates it to the sample and takes in a fluorescence generated from the sample by the irradiation of an excitation light, an optical path branch element that is an optical path branch means disposed on an optical path between the laser light source and the objective and that branches the optical path of the excitation light and the optical path of the fluorescence, a scanning optical system that is a scanning means which shifts alight collecting position of the excitation light on the focal plane of the objective in the direction that is orthogonal to the optical axis of the objective, the scanning optical system being disposed on an optical path between the objective and the optical path branch element, and an optical detector that is an optical detection means which outputs a signal to the image operation unit.

The optical detector is a two-dimensionally arrayed detector 10 illustrated in FIG. 1, for example, and it has a plurality of light-receiving elements. In the optical detector, a plurality of light-receiving elements are arrayed two-dimensionally so that a light-receiving surface is positioned on the imaging plane that is on an optical path of the fluorescence that is branched from an optical path of the excitation light and that is optically conjugated with a focal plane. Further, a pitch of these light-receiving elements is shorter than a diameter of a fluorescence Airy disk that is formed on a light-receiving surface, so that a super-resolution component can be detected, as mentioned above.

Specifically, it is desirable that a plurality of light-receiving elements be arrayed so as to divide a region on which a fluorescence Airy disk is formed into 3×3 or larger. With this, a Nyquist frequency of the confocal image element gets larger than a cut-off frequency of the optical system of the microscope main body. Therefore, a situation in which the super-resolution component is not detected due to a low Nyquist frequency can be prevented. Here, the Nyquist frequency refers to a cut-off frequency by an image sampling. That is to say, image data cannot express a frequency component that is equal to or greater than the Nyquist frequency. In particular, as illustrated in FIG. 13, when a plurality of light-receiving elements are arrayed so as to divide a region on which a fluorescence Airy disk is formed into 5×5, super-resolution characteristics and noise characteristics of confocal image elements are well balanced. When arraying a plurality of light-receiving elements so as to divide a region on which a fluorescence Airy disk is formed into 4×4, high-speed processing can be realized by using a PMT array sensor that is commercially available as a two-dimensionally arrayed detector 10.

FIG. 13 is a drawing which illustrates a relationship between a division number of an Airy disk and the FWHM of $PSF_{LSM}$ of the apparatus calculated by simulations. A dashed line (LSM) indicates a result in a conventional confocal microscope that does not use a two-dimensionally arrayed detector 10. A solid line (ISM) and a dashed-dotted line (ISM-SR) indicate a result in the conventional ISM apparatus and the ISM apparatus of the present invention, respectively. A dotted line (Nyquist) indicates a resolution limit by a Nyquist frequency of the confocal image element when a pixel pitch of the confocal image element is set as half of the pitch of the light-receiving element of the two-dimensionally arrayed detector 10 that is projected onto a sample surface. FIG. 13 indicates a result wherein the FWHM (full width half maximum) is not narrowed or is not changed substantially, even when the division number is increased more than 5×5. A simulation is performed under a condition in which a fluorescence wavelength is 520 nm, a numerical aperture of the objective is 1.4, a cut-off period (1/cut-off frequency) is 186 nm, and Rayleigh diameter of $PSF_{LSM}$ is 453 nm, and the super-resolution operation is performed by using a filter that is optimized for each division number.

As the two-dimensionally arrayed detector 10, various types of array sensors may be used other than a PMT (Photomultiplier Tube) array sensor, including an EM (Electron Multiplying)-CCD array sensor, a TDI (Time Delay Integration)-CCD array sensor, an APD (Avalanche Photo Diode) array sensor, and the like. By using an EM-CCD array sensor, for example, a frame rate may be set higher compared with general CCDs, and therefore, an image can be obtained at a high speed. In addition, although it is necessary to make an optical axis coincide with a center of the sensor array due to few pixel numbers (the number of light-receiving elements) of a PMT array sensor, in the EM-CCD array sensor, it is not necessary to precisely make the optical axis coincide with the center of the sensor array since it has a large number of pixels, and therefore, it may change the pixel that is the addition target even when the optical axis deviates from the center of the sensor array. Further higher speed processing compared with the PMT array sensor is also available by using the APD array sensor. Since a plurality of light-receiving elements is arrayed in a prescribed pitch in these array sensors, the FWHM of the $PSF_{LSM}$ of each light-receiving element becomes constant. Further, although a light-receiving sensitivity of each light-receiving element is substantially constant, a difference of a light-receiving sensitivity between light-receiving elements generated by manufacturing errors and the like can be compensated by a gain correction to an output signal. This is performed on the basis of, for example, information of a luminance value of each pixel of the image that imaged the sample of uniform brightness.

The microscope main body may further include a variable power optical system for changing a diameter of a fluorescence spot (Airy disk) projected on the light-receiving surface of the two-dimensionally arrayed detector 10. The variable power optical system is disposed on an optical path between the optical path branch element and the two-dimensionally arrayed detector 10, that is, at a position where it acts only on fluorescence. By including the variable power optical system, the number of light-receiving elements within an Airy disk region can be adjusted. Specifically, the Airy disk diameter that may change in accordance with the objective or the fluorescence wavelength to be used can be maintained to a specific diameter by the variable power optical system, for example.

In the meantime, since the Airy disk diameter becomes larger as the wavelength becomes longer, it is desirable, in simultaneously detecting several kinds of fluorescence each having a different wavelength, to set the variable power optical system so as to include the appropriate number of light-receiving elements in the Airy disk region that is formed by fluorescence with the shortest wavelength. With this, all kinds of fluorescence each having a different wavelength may preferably be detected. The variable power optical system may also be set when detecting several kinds of fluorescence each having a different wavelength in serial order. With this, resetting of the variable power optical system when the fluorescence wavelength is changed can be omitted.

The microscope main body may further include an aperture diaphragm at a position that is on an optical path of fluorescence and is optically conjugated with a focal plane of the objective. Although a diaphragm need not be included to detect a super-resolution component, by including the aperture diaphragm, an effect of inhibiting detection of a stray light or a sectioning effect can be obtained. The aperture diaphragm may be disposed right in front of the light-receiving surface of the two-dimensionally arrayed detector 10 for the purpose of inhibiting detection of stray light.

The microscope main body may further include an aligning mechanism which adjusts the position of the two-dimensionally arrayed detector 10 with respect to the fluorescence optical axis. The aligning mechanism shifts the two-dimensionally arrayed detector 10 relatively with respect to the fluorescence so that the center position of the light-receiving surface of the two-dimensionally arrayed detector 10 and the fluorescence optical axis are matched up, for example. With this, light-receiving elements may be disposed within an Airy disk region with certainty.

The aligning mechanism may be controlled in response to the signal from each light-receiving element of the two-dimensionally arrayed detector 10. The alignment of the two-dimensionally arrayed detector 10 may be automated, for example, by shifting the two-dimensionally arrayed detector 10 relatively with respect to the fluorescence, so that signal intensity from the light-receiving element which is positioned at the center of the two-dimensionally arrayed detector 10 becomes the highest.

Hereafter, specific explanations are given for each embodiment.

Embodiment 1

FIG. 14 is a drawing which exemplifies a configuration of a confocal image generation apparatus according to the present embodiment. A confocal image generation apparatus 100 illustrated in FIG. 14 is an apparatus for generating a super-resolution image by using the ISM, and it includes a confocal microscope main body, a PMT controller 116, a galvano controller 117, and a PC 118 that is an image operation unit which generates a super-resolution image.

The confocal microscope main body has a similar configuration to that of a general confocal microscope, with regard to the optical system from a laser light source 101 to a sample 109, and to the optical system from the sample 109 to a confocal pinhole plate 113. The confocal microscope main body differs from the general confocal microscope in that it includes a magnifier 114 in a latter stage of the confocal pinhole plate 113 and it includes a multi-channel PMT 115 instead of a single-channel detector. The multi-channel PMT 115 has a plurality of light-receiving elements. Further, the multi-channel PMT 115 is an optical detector in which a plurality of light-receiving elements are arrayed two-dimensionally with a pitch shorter than a diameter of a fluorescence Airy disk formed on an imaging plane, and the light-receiving surfaces are positioned on an imaging plane that is optically conjugated with a focal plane of an objective 108.

In the confocal image generation apparatus 100, laser light emitted from the laser light source 101 as an excitation light that excites the sample 109 passes through a single mode optical fiber 102 to be collected at a first intermediate image position P1. After that, a laser light collimated at a collimator 103 is reflected by a dichroic mirror 104 that is an optical path branch element and, via a galvano mirror 105, a pupil lens 106, and an imaging lens 107, irradiates to the objective 108. Then, as the objective 108 collects a laser light on the sample 109, that is, on the focal plane of the objective 108, the laser light is irradiated to the sample 109. In the meantime, the light-collecting position of the laser light is shifted to an X-Y direction that is orthogonal to the optical axis as a galvano controller 117 drives the galvano mirror 105 on the basis of a modulation control signal from the PC 118. With this, a sample 109 is scanned two-dimensionally by a laser light.

At the sample 109 to which a laser light is irradiated, a fluorescent material that exists at a light collecting position is excited and fluorescence is generated from the sample 109. The fluorescence travels on the same path as that of laser light but in an opposite direction and passes through the dichroic mirror 104. The fluorescence that has passed through the dichroic mirror 104 passes through a barrier filter 110 that blocks the laser light and is collected by a confocal lens 111 and becomes incident to a confocal pinhole plate 113 on which a confocal pinhole is formed at a second intermediate image position P2 via a shifter 112. An inclination of the shifter 112 is adjusted beforehand so that an optical axis of the fluorescence is matched up with a center of a confocal pinhole. That is to say, at a confocal image generation apparatus 100, the shifter 112 functions as an aligning mechanism that adjusts the position of the multichannel PMT 115 with respect to the optical axis of the fluorescence.

At the confocal pinhole plate 113, the fluorescence generated from other than a light collecting position is blocked. Therefore, only the fluorescence generated from the light collecting position passes through the confocal pinhole. A pinhole diameter of the confocal pinhole plate 113 may be set in accordance with a thickness to be sectioned. Accordingly, at the confocal image generation apparatus 100, it is not necessary to excessively reduce a size of the pinhole of the confocal pinhole plate 113 in order to detect a super-resolution component. Then, the fluorescence that has passed through the pinhole becomes incident to a magnifier 114. As the magnifier 114 enlarges a fluorescence spot that has passed the confocal pinhole plate 113, the enlarged fluorescence spot is projected on a light-receiving surface of the multi-channel PMT 115. The result is that fluorescence is detected at a plurality of light-receiving elements of the multi-channel PMT 115. A magnifier 114 is, for example, a zoom variable power optical system. A magnification of the magnifier 114 is adjusted so that a predetermined number of light-receiving elements are positioned within a region of a fluorescence Airy disk that is formed on the light-receiving surface of the multi-channel PMT 115.

When fluorescence is detected at the microscope main body, the PC 118 generates a super-resolution image of the sample 109 on the basis of a signal that is output from the plurality of light-receiving elements of the multi-channel PMT 115 and scanning position information of the galvano mirror 105.

Figure 16:
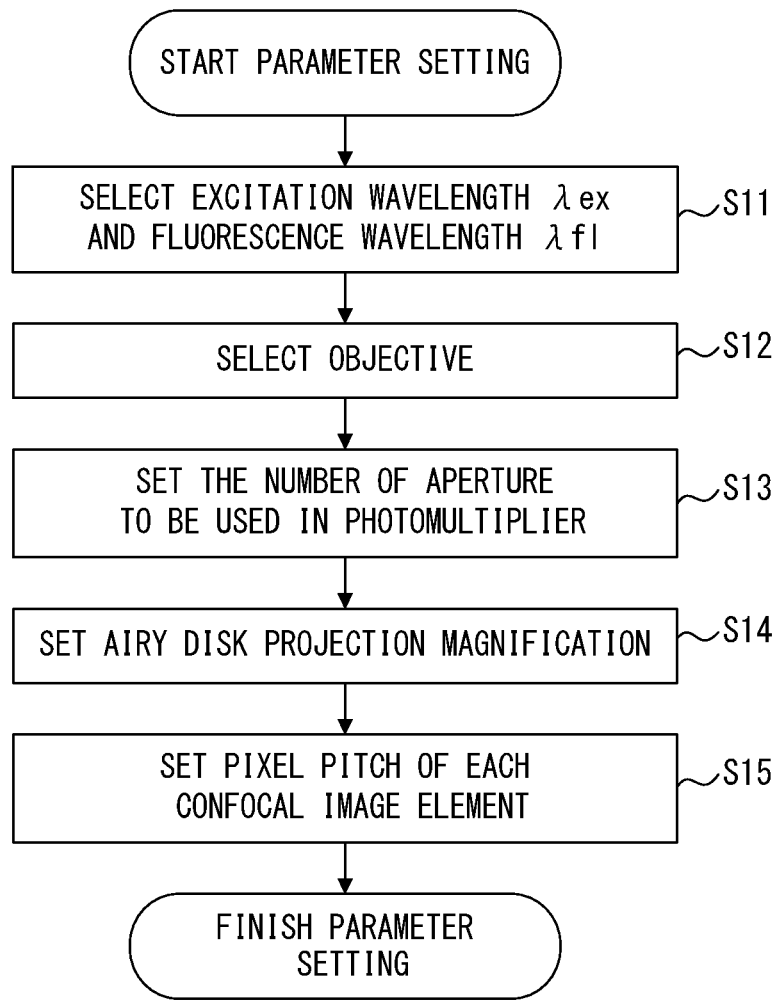
FIG. 16 is a drawing which illustrates a flow of parameter setting processing illustrated in FIG. 15.
Figure 17:
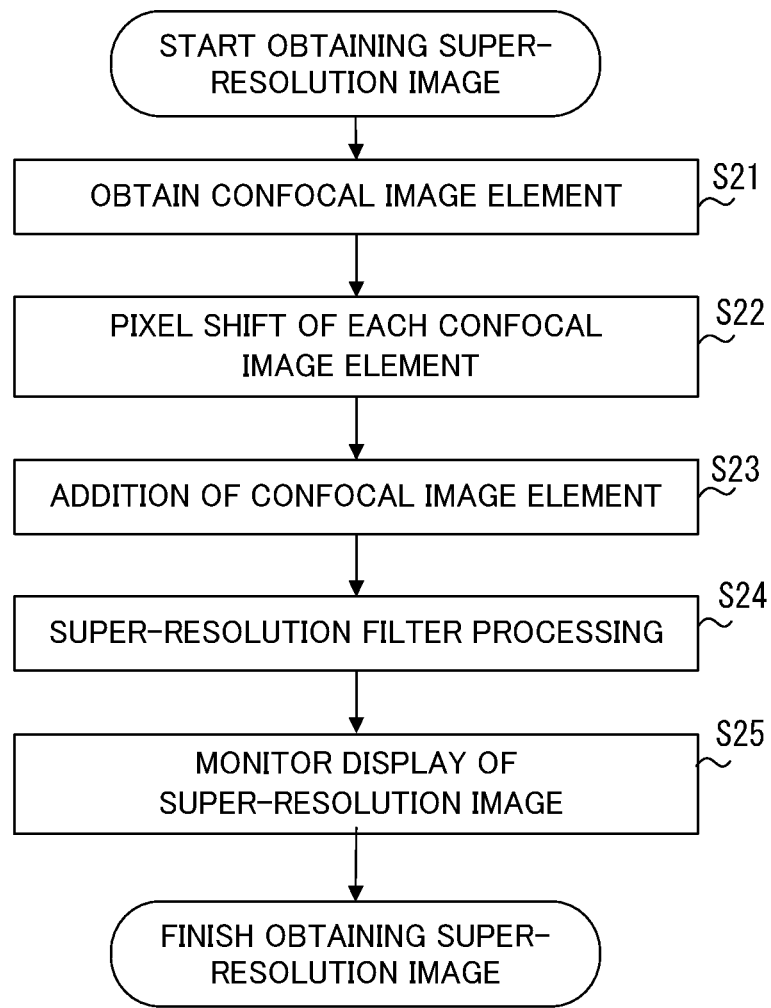
FIG. 17 is a drawing which illustrates a flow of super-resolution image obtainment processing illustrated in FIG. 15.

FIG. 15 is a drawing which illustrates a flow of the entire processing that is executed by a confocal image generation apparatus 100. FIG. 16 and FIG. 17 are drawings which illustrate a flow of parameter setting processing and a flow of super-resolution image obtainment processing illustrated in FIG. 15, respectively. Hereafter, specific explanations are given for a method of generating a super-resolution image by the confocal image generation apparatus 100, in reference to FIG. 15 to FIG. 17.

When processing illustrated in FIG. 15 commences, first, the confocal image generation apparatus 100 sets a parameter in accordance with an input from a user (step S10).

In further detail, as illustrated in FIG. 16, first, a user selects an excitation wavelength $\lambda_{ex}$ and a fluorescence wavelength (detection wavelength) $\lambda_{fl}$ to be used for observation, and in response to this, the confocal image generation apparatus 100 sets the selected excitation wavelength $\lambda_{ex}$ and the fluorescence wavelength (detection wavelength) $\lambda_{fl}$ (step S11). Further, the user selects an objective 18. In response to this, the confocal image generation apparatus 100 sets a numerical aperture NA of the selected objective and a diameter of a fluorescence Airy disk in the second intermediate position P2.

Next, the confocal image generation apparatus 100 sets the number of light-receiving elements (that is, the number of apertures) to be used from among the light-receiving elements that the multi-channel PMT 115 has (step S13). Here, the number of light-receiving elements selected by the user may be set. Alternatively, a predetermined number of the light-receiving elements of 3×3 or larger may be set. After that, the confocal image generation apparatus 100 calculates and sets a magnification of the magnifier 114 (that is, projection magnification of an Airy disk) on which the fluorescence Airy disk in the second intermediate position P2 is enlarged and projected, so that the fluorescence becomes incident to the light-receiving elements to be used (step S14).

Finally, the confocal image generation apparatus 100 sets a pixel pitch of the confocal image element (step S15). Here, the pixel pitch of the confocal image element is set so that a correction amount at an origin position correction unit 40 is an integral multiple of the pixel pitch of the confocal image element.

When the parameter setting processing illustrated in FIG. 16 finishes, the confocal image generation apparatus 100 obtains a super-resolution image of the sample 109 (step S20).

In further detail, as illustrated in FIG. 17, first, the confocal image generation apparatus 100 obtains a confocal image element (step S21). The processing performed in this step corresponds to the processing at a confocal image generation unit 30 in FIG. 5. By scanning the sample 109 with the galvano mirror 105, the confocal image element that corresponds to each of these light-receiving elements is obtained on the basis of the signal that is output from each of the light-receiving elements that was set in step S13 of FIG. 16.

Next, the confocal image generation apparatus 100 performs a pixel shift processing on a confocal image element (step S22). The processing performed in this step corresponds to the processing at the origin position correction unit 40 in FIG. 5, in which image data is shifted by a number of pixels determined for each confocal image element. By the setting of step S15, the correction amount of the origin position of each confocal image element becomes an integral multiple of the pixel pitch of the confocal image element. Accordingly, the origin position of each confocal image element is appropriately corrected by the pixel shift.

Further, the confocal image generation apparatus 100 adds a confocal image element on which pixel shift processing has been performed and generates a synthesized confocal image (step S23). The processing performed in this step corresponds to the processing at the image addition unit 50 in FIG. 5. Then, the confocal image generation apparatus 100 performs super-resolution filter processing on the synthesized confocal image and generates a super-resolution image (step S24). The processing performed in this step corresponds to the processing at the super-resolution operation unit 60 in FIG. 5. Then, the confocal image generation apparatus 100 displays the generated super-resolution image on a display unit of the PC 118 (step S25).

When the super-resolution image obtainment processing illustrated in FIG. 17 finishes, the confocal image generation apparatus 100 determines whether or not re-obtainment for the super-resolution image has been instructed (step S30). When the re-obtainment for the super-resolution image has been instructed, the confocal image generation apparatus 100 goes back to step S20 and obtains another super-resolution image again. On the other hand, when the re-obtainment for the super-resolution image has not been instructed, the confocal image generation apparatus 100 determines whether or not storage of the super-resolution image has been instructed (step S40). And when the storage has been instructed, the confocal image generation apparatus 100, after recording the super-resolution image in a non-volatile recording medium of the PC 118 (step S50), finishes the processing of FIG. 15. When the storage has not been instructed, the confocal image generation apparatus 100 finishes the processing of FIG. 15 without recording the super-resolution image.

The confocal image generation apparatus 100 according to the present embodiments, unlike a conventional confocal microscope, can generate a super-resolution image while it detects the fluorescence without waste. Accordingly, the confocal image generation apparatus 100 can generate a super-resolution image with a high S/N ratio.

Although in the explanations given so far embodiments in which the PC 118 operates similarly to the image operation unit 20*a* illustrated in FIG. 5 have been illustrated, the PC 118 may operate similarly to the image operation unit 20*b* illustrated in FIG. 6, and similarly to the image operation unit 20*c* illustrated in FIG. 7. Further, instead of pixel shift processing, processing of delaying a signal may be performed at the PC 118. The PC 118 may also operate similarly to the image operation unit 20*d* illustrated in FIG. 8, similarly to the image operation unit 20*e* illustrated in FIG. 9, and similarly to the image operation unit 20*f* illustrated in FIG. 10.

Embodiment 2

FIG. 18 is a drawing which exemplifies a configuration of a confocal image generation apparatus according to the present embodiment. The confocal image generation apparatus 200 illustrated in FIG. 18 is an apparatus that generates a super-resolution image by using the ISM, similarly to the confocal image generation apparatus 100 according to embodiment 1. The confocal image generation apparatus 200 is one that is obtained by modifying the confocal image generation apparatus 100 so as to realize a two-wavelength simultaneous detection.

The confocal image generation apparatus 200 differs from the confocal image generation apparatus 100 in that the confocal image generation apparatus 200 includes a multi-wavelength laser light source 201 that emits a laser light with a multi-wavelength instead of the laser light source 101, that it includes a configuration which separates fluorescence with different wavelengths at a latter stage of the magnifier 114 to lead each of the separated fluorescence to different multi-channel PMTs (a configuration that includes a dichroic mirror 219, a confocal pinhole plate 213*a*, a confocal pinhole plate 213*b*, a multi-channel PMT 215*a*, a multi-channel PMT 215*b*, a PMT controller 216*a*, and a PMT controller 216*b*), and that it includes an aligning mechanism (stage 212*a*, stage 212*b*) which shifts the multi-channel PMT relatively with respect to each optical axis of the fluorescence that was separated by the dichroic mirror 219, instead of the shifter 112.

Similarly to the confocal image generation apparatus 100 according to the embodiment 1, a super-resolution image may also be generated at the confocal image generation apparatus 200 by detecting the fluorescence without waste. Therefore, the super-resolution image with a high S/N ratio can be generated. Further, at the confocal image generation apparatus 200, as the multi-wavelength laser light source 201 emits a laser light with different excitation wavelengths, fluorescence with different wavelengths at the multi-channel PMT215*a* and at the multi-channel PMT215*b* can simultaneously be detected. Accordingly, two colored super-resolution images can be simultaneously generated. With this, a dynamic correlation of positions of different florescent pigments may be calculated.

In the meantime, although the pinhole diameter of the confocal pinhole plate 213a and of the confocal pinhole plate 213b may be set in accordance with a thickness to be sectioned, these may be set to different diameters considering the difference of detected wavelengths. Further, the confocal pinhole plate 213a and the confocal pinhole plate 213b are disposed in the vicinity of the light-receiving surface of the multi-channel PMT 215a and the multi-channel PMT 215b, respectively. However, the confocal pinhole plate may be positioned such that it is conjugated with the confocal surface of the objective 108, and is not limited to the vicinity of the multi-channel PMT. Further, the magnifier 114 is disposed between the dichroic mirror 219 and the confocal lens 111. However, each magnifier 114 may be disposed between the dichroic mirror 219 and the confocal pinhole plate 213a and disposed between the dichroic mirror 219 and the confocal pinhole plate 213b. Regarding other matters, the confocal image generation apparatus 200 shares commonality with the confocal image generation apparatus 100 according to the embodiment 1, in that the PC 118 may operate similarly to the image operation unit illustrated in FIG. 6 to FIG. 10. In addition, although not illustrated, the embodiment may also include a configuration of forming images of a plurality of fluorescence spots each having different wavelength to different portions within a light-receiving element array of the multi-channel PMT 215b to simultaneously detect them, by replacing the dichroic mirror 219 with a spectral separation element such as a diffraction grating, for example.

Embodiment 3

FIG. 19 is a drawing which exemplifies a configuration of a confocal image generation apparatus according to the present embodiment. The confocal image generation apparatus 300 illustrated in FIG. 19 is an apparatus that generates a super-resolution image using the ISM, similarly to the confocal image generation apparatus 100 according to embodiment 1. The confocal image generation apparatus 300 differs from the confocal image generation apparatus 100 according to embodiment 1, in that the confocal image generation apparatus 300 includes a TDI-CCD 301 instead of a multi-channel PMT 115, it includes a TDI-CCD controller 302 instead of the PMT controller 116, it includes a PC 303 instead of the PC 118, and it includes a delay addition unit 304 between the TDI-CCD 301 and the PC 303.

Figure 20A:
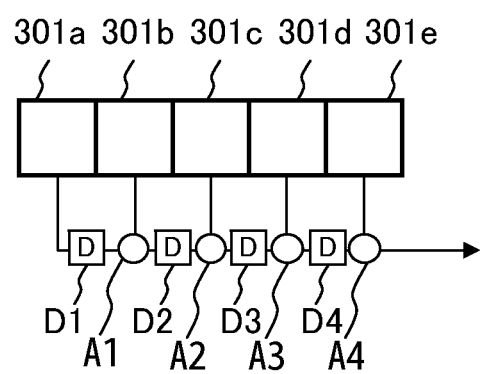

The TDI-CCD 301 has a configuration that is similar to the two-dimensionally arrayed detector 10a illustrated in FIG. 12. That is to say, the TDI-CCD 301 includes a first delay unit and a first signal addition unit in addition to a plurality of light-receiving elements that are arrayed two dimensionally. More specifically, the TDI-CCD 301 includes, for each row, a plurality of light-receiving elements (a light-receiving element 301a, a light-receiving element 301b, a light-receiving element 301c, a light-receiving element 301d, and a light-receiving element 301e), addition circuits (an addition circuit A1, an addition circuit A2, an addition circuit A3, and an addition circuit A4, or when not discriminated, referred to as an addition circuit A) that are a first signal addition unit, and delay circuits (a delay circuit D1, a delay circuit D2, a delay circuit D3, and a delay circuit D4, or when not discriminated, referred to as a delay circuit D) that are a first delay unit, as illustrated in FIG. 20A.

The delay addition unit 304 has a configuration that is similar to the delay adder 21 illustrated in FIG. 12. That is to say, the delay addition unit 304 includes a second delay unit that delays a signal for each row that was output from the TDI-CCD 301 by a delay amount that differs for each row and a second signal addition unit that adds the signal which was output for each row from the second delay unit.

The PC 303 has a configuration that is similar to the image operation unit 20g illustrated in FIG. 12. That is to say, the PC 303 includes a confocal image generation unit that generates a synthesized confocal image from the signal output from the delay addition unit 304 and a super-solution operation unit that emphasizes the super-resolution component with respect to the synthesized confocal image generated at the confocal image generation unit.

First, in reference to FIG. 20A to FIG. 20G, explanations are given for a general operation of the TDI-CCD 301, when a fluorescence spot is irradiated onto each light-receiving element in order, with the same time interval as the delay time produced by a delay circuit D.

At time 0, when a fluorescence spot SP1 is irradiated onto a light-receiving element 301a as illustrated in FIG. 20B, a signal s1 that was output from the light-receiving element 301a is transmitted to an addition circuit A1 with a delay by a prescribed delay time (t1) at a delay circuit D1. Next, when a fluorescence spot SP2 is irradiated onto a light-receiving element 301b as illustrated in FIG. 20C after time t1 from the irradiation of the fluorescence spot SP1, the signal s2 that was output from the light-receiving element 301b is transmitted to the addition circuit A1 with the same timing as the signal s1. Then, the signal s1 and the signal s2 are added at the addition circuit A1. Accordingly, a signal sc1 that is an output from the addition circuit A1 becomes a signal that has the same pulse waveform as that of the signal s1 (the signal s2) and that has its intensity amplified twofold. The signal sc1 is further delayed by a prescribed delay time (t1) at a delay circuit D2 and then transmitted to the addition circuit A2.

Figure 20F:
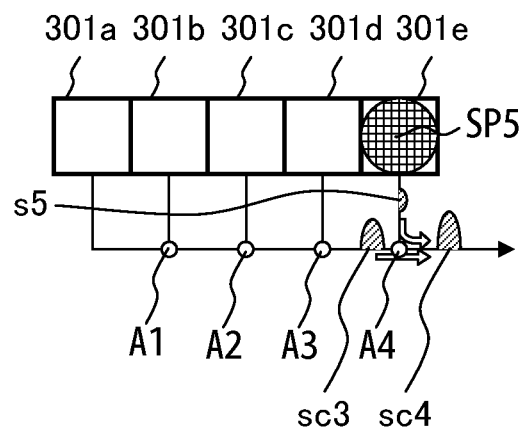

The signals from light-receiving elements 301c, 301d, and 301e are added similarly, as illustrated in FIG. 20D to FIG. 20F. Consequently, at the TDI-CCD 301, the signal from the light-receiving element that is disposed in a row direction (a transmission direction of an electric pulse) is added. Accordingly, a signal which has the same waveform as that of the electric pulse generated from each light-receiving element and in which the electric pulse generated from each light-receiving element is amplified by the number of the light-receiving elements (the pixel numbers) that are arrayed in the row direction is output. As illustrated in FIG. 20G, the TDI-CCD 301 has a plurality of similar configurations in the direction orthogonal to the transmission direction of the electric pulse (that is, in the column direction). With this, such a signal is output, for each row, to the delay addition unit 304 illustrated in FIG. 21. In general, by using such an operation, a delay time of the delay circuit D of each light-receiving element is appropriately set and an image of an object that moves at a uniform velocity may be captured as if it were still, for example.

The confocal image generation apparatus 300 having the TDI-CCD 301 which operates above performs the correction of the origin position that is performed at the ISM by setting a delay time for each light-receiving element in a primary scanning direction and for each array of a light-receiving element in a secondary scanning direction that is orthogonal to the first scanning direction and by generating a time delay. This is realized by setting the confocal image generation apparatus 300 as follows.

A transmission speed of the TDI-CCD 301 is set about twofold as a scanning speed of the galvano mirror 105 in a primary scanning direction (a direction that corresponds to a row direction of the TDI-CCD 301). When a delay time is set designating a position of a light-receiving element 301c as a standard for each light-receiving element in a primary scanning direction of the TDI-CCD 301, a delay time is appropriately set such that it becomes late at a side toward a scanning direction of the light-receiving element 301c and that it becomes early at an opposite side toward a scanning direction, for example. With this, timing for discharging a signal from each light-receiving element is corrected so that a signal from another light-receiving element gets closer to the signal of a light-receiving element 301c. At this time, a signal at a time when it is scanned by the galvano mirror 105 not in a reciprocating direction but always in a positive direction of a primary scanning direction is obtained. When obtaining a signal during scanning in a reciprocating direction, a positive delay time may be switched to a negative time, or a negative delay time may be switched to a positive time, in accordance with the direction. Further, a one-row scanning is completed in a primary scanning direction by the galvano mirror 105, and with regard to a scanning in a secondary scanning direction that moves to a subsequent row, a transmission speed within the delay addition unit 304 of the PC 303 is set at about twofold of the scanning speed of the galvano mirror 105 in the secondary scanning direction (the direction that corresponds to a column direction of the TDI-CCD 301). In addition, when discharging a signal to the delay addition unit 304 from the TDI-CCD 301, on the basis of an idea that is similar to delay time setting of each light-receiving element in a primary scanning direction, a delay time for each row is set. With this, signals from each light-receiving element are delayed by a delay time that is determined on the basis of the scanning speed of the galvano mirror 105 and the position of the light-receiving element until the signal is output from the delay addition unit 304, and delayed signals are added.

At the confocal image generation apparatus 300 that was set as mentioned above, the origin position is corrected by a time delay. Accordingly, the PC 303 can generate a super-resolution image from a signal received from the delay addition unit 304 on substantially a real-time basis. In addition, the origin position can be corrected on a real-time basis by a time delay with respect to the signal at the TDI-CCD 301 and the delay addition unit 304. Therefore, at the confocal image generation apparatus 300, an amount of data to be temporarily stored can be reduced.

Although in FIG. 19, a configuration in which the delay addition unit 304 is provided between the TDI-CCD 301 and the PC 303, the delay addition unit 304 can be omitted. In this case, the PC 303 may generate confocal image elements from a signal for each row that is output from the TDI-CCD 301, synthesize these confocal image elements after correcting the origin position of the confocal image elements for each row, and generate a super-resolution image from the synthesized confocal image. Further, the PC 303 may generate super-resolution image elements after generating confocal image elements from a signal for each row, correct the origin position of the super-resolution image elements for each row, and synthesize these super-resolution image elements to generate a super-resolution image.

Although the above mentioned embodiments have been described for the purposes of specific illustrations to facilitate an understanding of the invention, the present invention is not limited to these embodiments. Accordingly, various modifications and alterations may be made for a confocal image generation apparatus according to the present invention without deviating from the spirit and scope of the present invention as stipulated in claims.

What is claimed is:

1. A confocal image generation apparatus comprising:
   a laser light source configured to emit an excitation light for exciting a sample;
   an objective configured to irradiate the sample with the excitation light by collecting the excitation light and to take in fluorescence generated from the sample by irradiation of the excitation light;
   an optical path branch element configured to branch an optical path of the excitation light and an optical path of the fluorescence, the optical path branch element being disposed on an optical path between the laser light source and the objective;
   a scanning optical system configured to shift a light collecting position of the excitation light on a focal plane of the objective in a direction that is orthogonal to an optical axis of the objective, the scanning optical system being disposed on an optical path between the objective and the optical path branch element;
   an optical detector having a plurality of light-receiving elements, in which the plurality of light-receiving elements are two-dimensionally arrayed with a pitch that is shorter than a diameter of an Airy disk of the fluorescence formed on an imaging plane, so that a light-receiving surface is positioned on an optical path of the fluorescence that is branched from an optical path of the excitation light and on the imaging plane that is optically conjugated with the focal plane; and
   an image operation unit configured to generate a confocal image of the sample in which a super-resolution component is enhanced with respect to a frequency component whose frequency is equal to or less than a cut-off frequency of the objective which is determined by a numerical aperture of the objective and a wavelength of the fluorescence, the super-resolution component being included in a signal output from the plurality of light-receiving elements and being a frequency component that exceeds the cut-off frequency.

2. The confocal image generation apparatus according to claim 1, wherein the image operation unit comprises:
   a confocal image generation unit which generates a plurality of confocal image elements based on a signal from the plurality of light-receiving elements;
   an origin position correction unit which corrects an origin position of the plurality of confocal image elements generated at the confocal image generation unit; and
   an image addition unit which adds a plurality of confocal image elements in which an origin position has been corrected at the origin position correction unit and generates a confocal image of the sample.

3. The confocal image generation apparatus according to claim 2, wherein the image operation unit further comprises a super-resolution operation unit which enhances the super-resolution component with respect to a confocal image generated at the image addition unit.

4. The confocal image generation apparatus according to claim 2, wherein the image operation unit further comprises a super-resolution operation unit which enhances the super-resolution component with respect to each of a plurality of confocal image elements generated at the confocal image generation unit.

5. The confocal image generation apparatus according to claim 2, wherein the image operation unit further comprises a super-resolution operation unit which enhances the super-resolution component with respect to each of a plurality of confocal image elements in which an origin position has been corrected at the origin position correction unit.

6. The confocal image generation apparatus according to claim 2, wherein the origin position correction unit:
   corrects an origin position of the plurality of confocal image elements, so as to get close to a projected position of a sample of a confocal image element generated based on a signal from a light-receiving element that is positioned at a center of the plurality of light-receiving elements; and
   corrects an origin position of the confocal image element by a greater amount as a distance from a center position of the plurality of light-receiving elements to a center position of a light-receiving element corresponding to the confocal image element increases.

7. The confocal image generation apparatus according to claim 6, wherein the origin position correction unit corrects an origin position of the confocal image element by a distance on the confocal image element that corresponds to half of a distance from a center position of the plurality of light-receiving elements to a center position of a light-receiving element corresponding to the confocal image element.

8. The confocal image generation apparatus according to claim 2, wherein the image addition unit adds confocal image elements generated based on a signal from light-receiving elements that output a signal with an intensity that exceeds a prescribed value from among a plurality of confocal image elements in which an origin position thereof has been corrected at the origin position correction unit and generates a confocal image of the sample.

9. The confocal image generation apparatus according to claim 2, wherein the image addition unit adds confocal image elements generated based on a signal from light-receiving elements that have a light-receiving surface within a region of an Airy disk of the fluorescence formed on the imaging plane from among a plurality of confocal image elements in which an origin position thereof has been corrected at the origin position correction unit and generates a confocal image of the sample.

10. The confocal image generation apparatus according to claim 1, wherein the image operation unit comprises:
    a delay unit which delays each signal from the plurality of light-receiving elements by a delay amount in accordance with each light-receiving element that outputs each signal;
    a signal addition unit which adds a plurality of signals delayed at the delay unit and outputs an addition signal; and
    a confocal image generation unit which generates a confocal image of the sample from an addition signal output from the signal addition unit.

11. The confocal image generation apparatus according to claim 1, wherein the optical detector comprises:
    a delay unit which delays each signal from the plurality of light-receiving elements by a delay amount in accordance with each light-receiving element that outputs each signal; and
    a signal addition unit which adds a plurality of signals delayed at the delay unit and outputs an addition signal; and
    wherein the image operation unit comprises:
    a confocal image generation unit which generates a confocal image of the sample from an addition signal output from the signal addition unit.

12. The confocal image generation apparatus according to claim 10, wherein the image operation unit further comprises a super-resolution operation unit which enhances the super-resolution component with respect to a confocal image generated at the confocal image generation unit.

13. The confocal image generation apparatus according to claim 1, wherein the image operation unit comprises:
    a delay unit which delays each signal from the plurality of light-receiving elements by a delay amount in accordance with each light-receiving element that outputs each signal;
    a confocal image generation unit which generates a plurality of confocal image elements based on a plurality of signals delayed at the delay unit; and
    an image addition unit which adds a plurality of confocal image elements generated at the confocal image generation unit and generates a confocal image of the sample.

14. The confocal image generation apparatus according to claim 13, wherein the image operation unit further comprises a super-resolution operation unit which enhances the super-resolution component with respect to a confocal image generated at the image addition unit.

15. The confocal image generation apparatus according to claim 13, wherein the image operation unit further comprises a super-resolution operation unit which enhances the super-resolution component with respect to each of a plurality of confocal image elements generated at the confocal image generation unit.

16. The confocal image generation apparatus according to claim 10, wherein the delay unit delays each signal from the plurality of light-receiving elements so that barycentric positions in a time direction that signals from the plurality of light-receiving elements have are matched.

17. A confocal image generation apparatus comprising:
    excitation light generation means configured to generate an excitation light for exciting a sample;
    an objective configured to irradiate the sample with the excitation light by collecting the excitation light and to take in fluorescence generated from the sample by irradiation of the excitation light;
    optical path branch means configured to branch an optical path of the excitation light and an optical path of the fluorescence, the optical path branch means being disposed on an optical path between the excitation light generation means and the objective;
    scanning means configured to shift a light collecting position of the excitation light on a focal plane of the objective in a direction that is orthogonal to an optical axis of the objective, the scanning means being disposed on an optical path between the objective and the optical path branch means;
    optical detection means having a plurality of light-receiving elements, in which the plurality of light-receiving elements are two-dimensionally arrayed with a pitch that is shorter than a diameter of an Airy disk of the fluorescence formed on an imaging plane, so that a light-receiving surface is positioned on an optical path of the fluorescence that is branched from an optical path of the excitation light and on the imaging plane that is optically conjugated with the focal plane; and
    image operation means configured to generate a confocal image of the sample in which a super-resolution component is enhanced with respect to a frequency component whose frequency is equal to or less than a cut-off frequency of the objective which is determined by a numerical aperture of the objective and a wavelength of the fluorescence, the super-resolution component being included in a signal output from the plurality of light-receiving elements and being a frequency component that exceeds the cut-off frequency.

* * * * *